US012462763B2

(12) United States Patent
Okuyama et al.

(10) Patent No.: US 12,462,763 B2
(45) Date of Patent: Nov. 4, 2025

(54) ELECTRONIC DEVICE

(71) Applicant: Japan Display Inc., Tokyo (JP)

(72) Inventors: Kentaro Okuyama, Tokyo (JP);
Kazuhiko Sako, Tokyo (JP); Tsutomu Harada, Tokyo (JP); Takayuki Nakanishi, Tokyo (JP); Kazunari Tomizawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 368 days.

(21) Appl. No.: 18/173,082

(22) Filed: Feb. 23, 2023

(65) Prior Publication Data

US 2023/0274711 A1 Aug. 31, 2023

(30) Foreign Application Priority Data

Feb. 28, 2022 (JP) ................................. 2022-029570

(51) Int. Cl.
*G09G 3/34* (2006.01)
*G02F 1/1334* (2006.01)
(Continued)

(52) U.S. Cl.
CPC ....... *G09G 3/3413* (2013.01); *G02F 1/13347* (2021.01); *G02F 1/133738* (2021.01);
(Continued)

(58) Field of Classification Search
CPC ............. G02F 1/1334; G02F 1/133622; G02F 1/133738; G02F 1/13347; G02F 1/133615;
(Continued)

(56) References Cited

U.S. PATENT DOCUMENTS 10,368,033 B2 7/2019 Huangfu
2004/0257473 A1* 12/2004 Miyagawa ............. H04N 7/144
348/571
(Continued)

FOREIGN PATENT DOCUMENTS

JP 2002094955 A 3/2002
JP 4411059 B2 2/2010
(Continued)

OTHER PUBLICATIONS

Japanese Office Action issued May 20, 2025, in corresponding Japanese Patent Application No. 2022-029570, 8pp.

*Primary Examiner* — William Boddie
*Assistant Examiner* — Saifeldin E Elnafia
(74) *Attorney, Agent, or Firm* — XSENSUS LLP

(57) ABSTRACT

According to one embodiment, an electronic device includes a display panel configured to display an image and including a display region that transmits external light, a light source unit, a camera opposed to the display region of the display panel, and a control unit. The control unit is configured to in a light emission period, permit irradiation of light by the light source unit, irradiate the display region with light, display the image in the display region, and prohibit capturing by the camera. The control unit is configured to in a capturing period, prohibit the irradiation of the light by the light source unit, set the display region to be transparent, permit the capturing by the camera, and take in the external light transmitted through the display region to the camera.

7 Claims, 24 Drawing Sheets

(51) Int. Cl.
*G02F 1/1337* (2006.01)
*G09G 3/36* (2006.01)
*H04N 23/60* (2023.01)
*G02F 1/1335* (2006.01)
*G02F 1/13357* (2006.01)
*G06F 1/16* (2006.01)
*H04N 7/15* (2006.01)
*H04N 23/63* (2023.01)

(52) U.S. Cl.
CPC ............... *G09G 3/36* (2013.01); *H04N 23/60* (2023.01); *G02F 1/1334* (2013.01); *G02F 1/133615* (2013.01); *G02F 1/133622* (2021.01); *G02F 2203/03* (2013.01); *G06F 1/1637* (2013.01); *G06F 1/1684* (2013.01); *G09G 3/3614* (2013.01); *G09G 3/3648* (2013.01); *G09G 3/3655* (2013.01); *G09G 3/3677* (2013.01); *G09G 2300/0465* (2013.01); *G09G 2300/0478* (2013.01); *G09G 2310/0235* (2013.01); *G09G 2320/064* (2013.01); *G09G 2354/00* (2013.01); *G09G 2360/145* (2013.01); *H04N 7/15* (2013.01); *H04N 23/63* (2023.01)

(58) Field of Classification Search
CPC .... G02F 2203/03; G09G 3/3413; G09G 3/36; G09G 3/3614; G09G 3/3648; G09G 3/3655; G09G 3/3677; G09G 2300/0465; G09G 2300/0478; G09G 2310/0235; G09G 2320/064; G09G 2354/00; G09G 2360/145; H04N 7/15; H04N 23/63; H04N 23/60; G06F 1/1637; G06F 1/1686; H04M 1/0264; H04M 1/0266
See application file for complete search history.

(56) References Cited

U.S. PATENT DOCUMENTS

| | | | |
|---|---|---|---|
| 2005/0128332 A1 | 6/2005 | Tsuboi | |
| 2009/0278913 A1* | 11/2009 | Rosenfeld | H04N 7/144 |
| | | | 348/E7.083 |
| 2014/0347436 A1 | 11/2014 | DeMerchant et al. | |
| 2017/0264865 A1* | 9/2017 | Huangfu | H04N 23/611 |
| 2018/0211610 A1* | 7/2018 | Kato | G09G 3/2092 |
| 2019/0325835 A1* | 10/2019 | Ozaki | G09G 3/3413 |

FOREIGN PATENT DOCUMENTS

| | | |
|---|---|---|
| JP | 2014-230282 A | 12/2014 |
| JP | 2018180196 A | 11/2018 |
| JP | 2021081553 A | 5/2021 |

\* cited by examiner

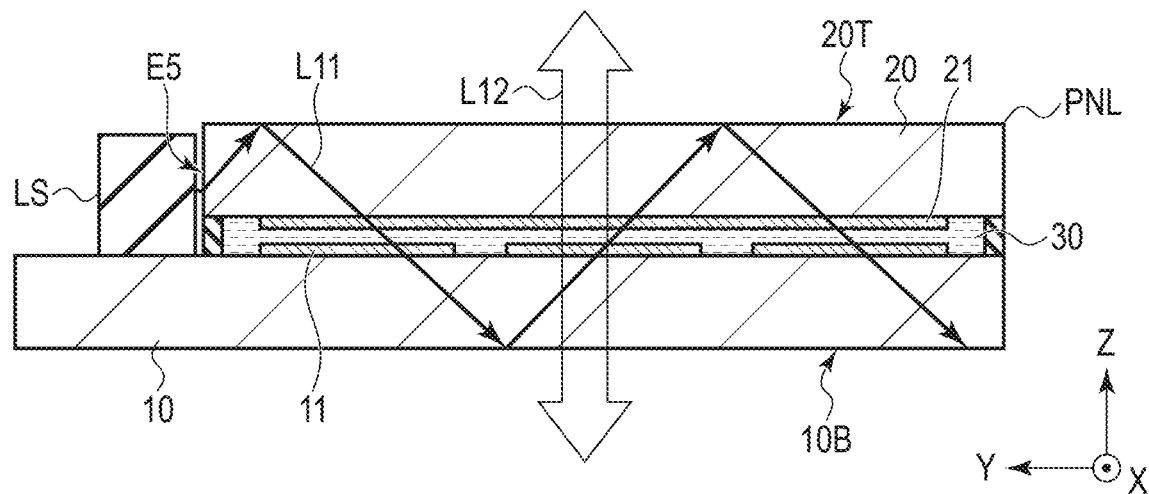
F I G. 6A
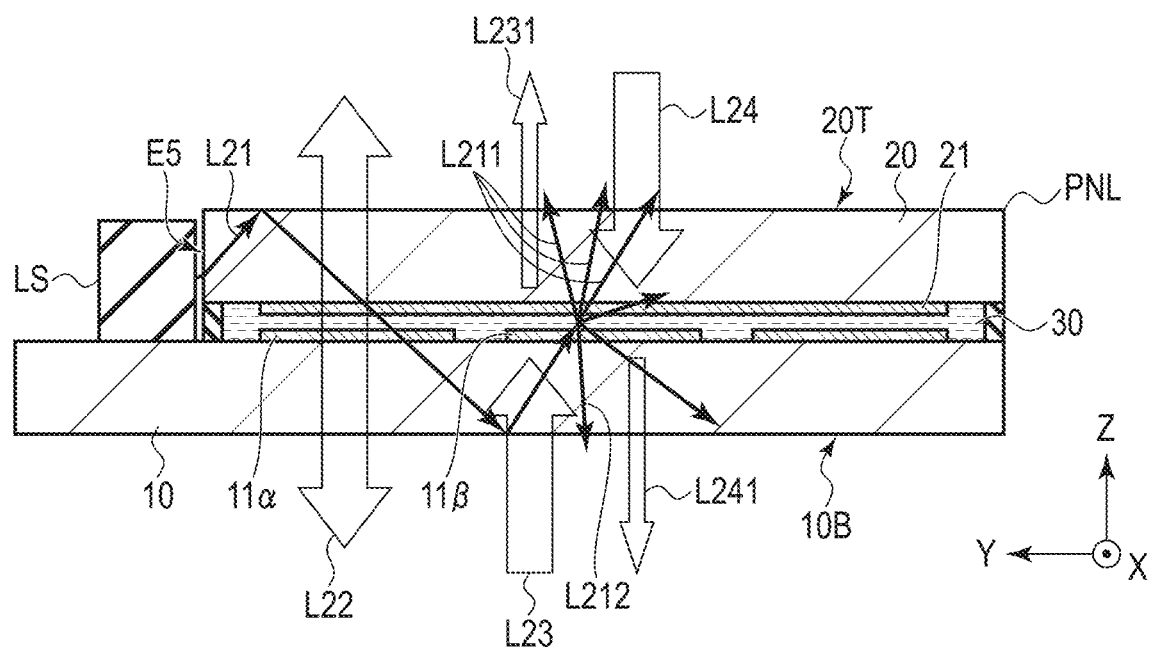
F I G. 6B

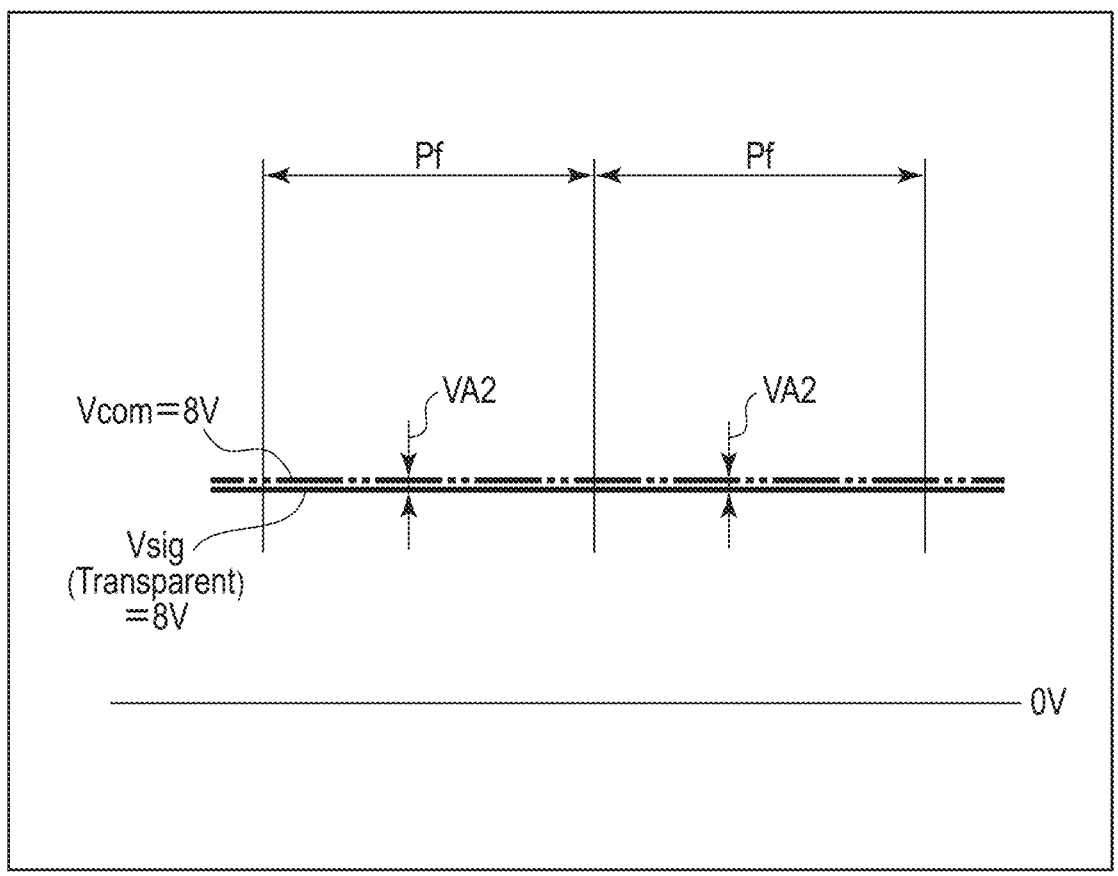
F I G. 11

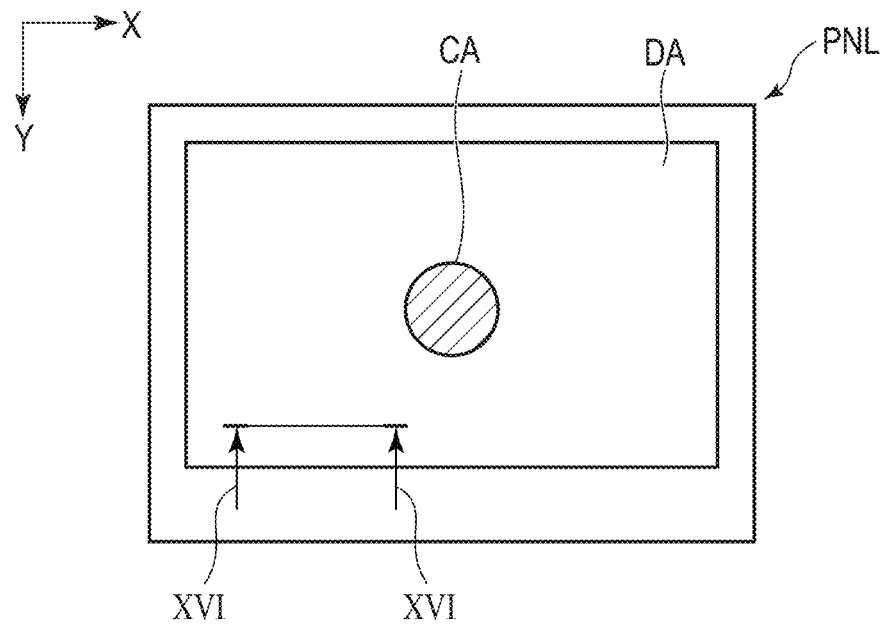
F I G. 15
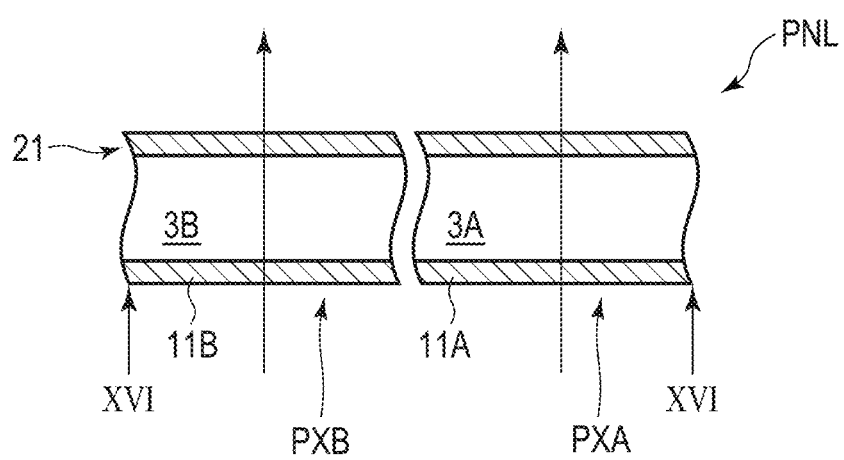
F I G. 16

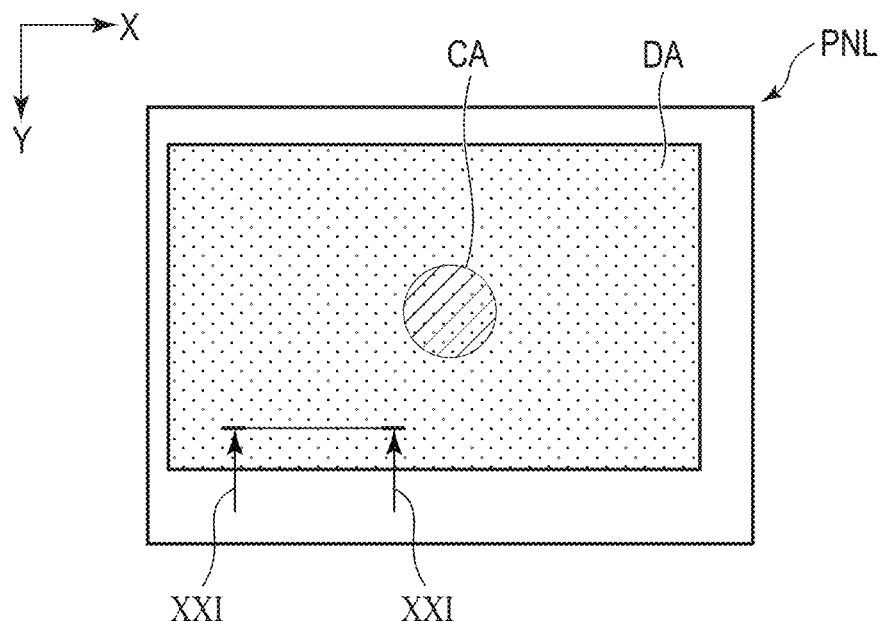
F I G. 20
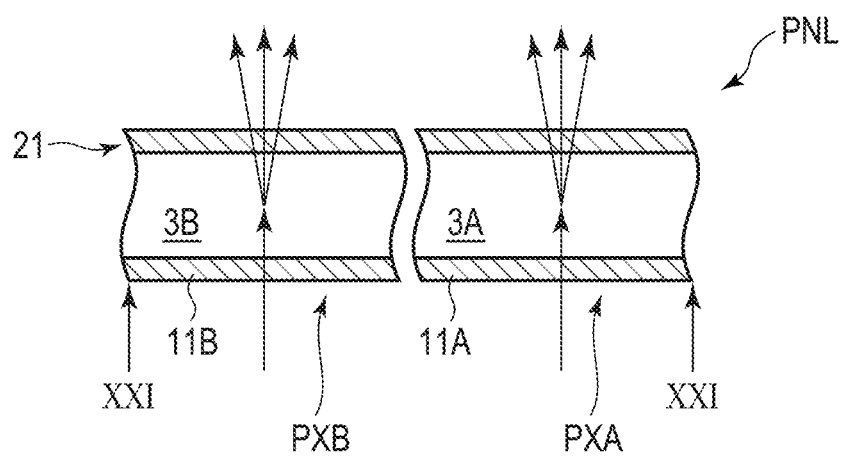
F I G. 21

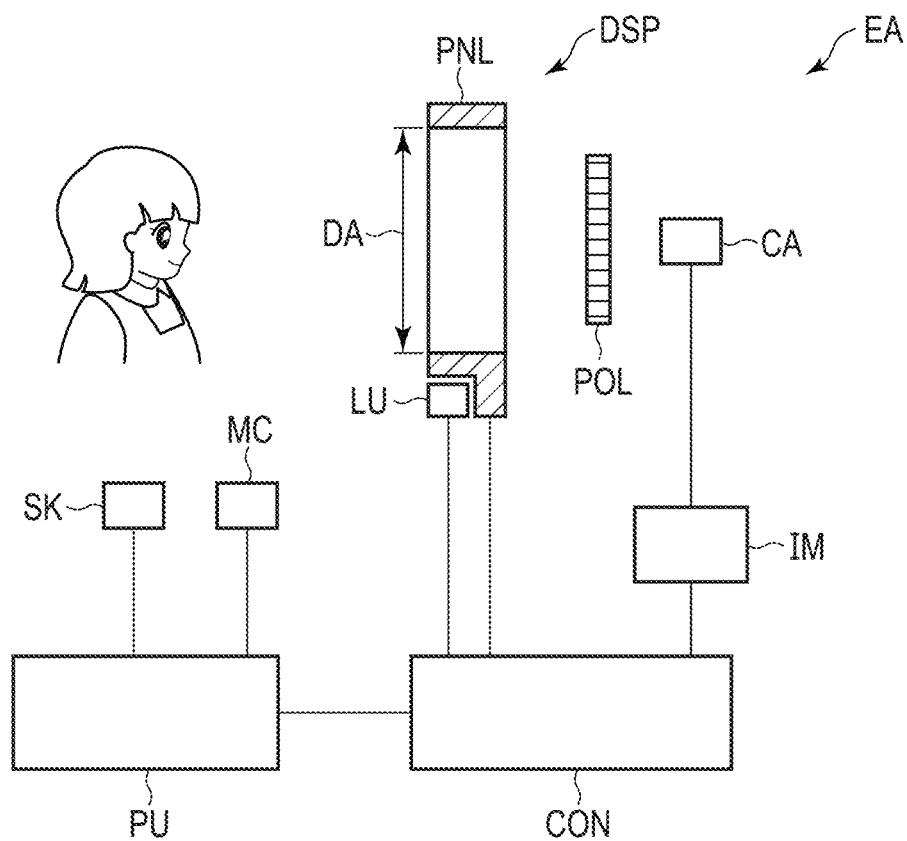
F I G. 23

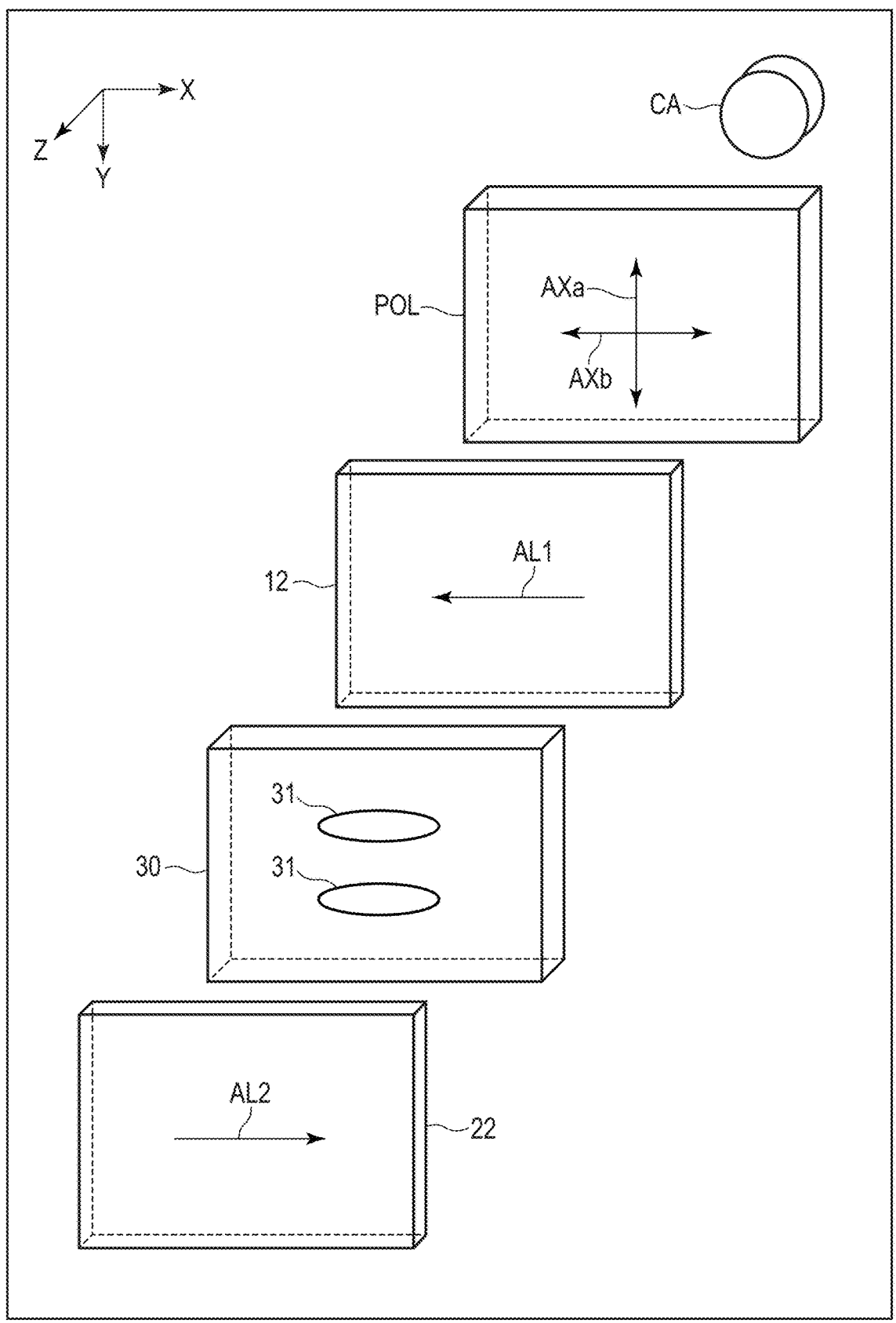
F I G. 24

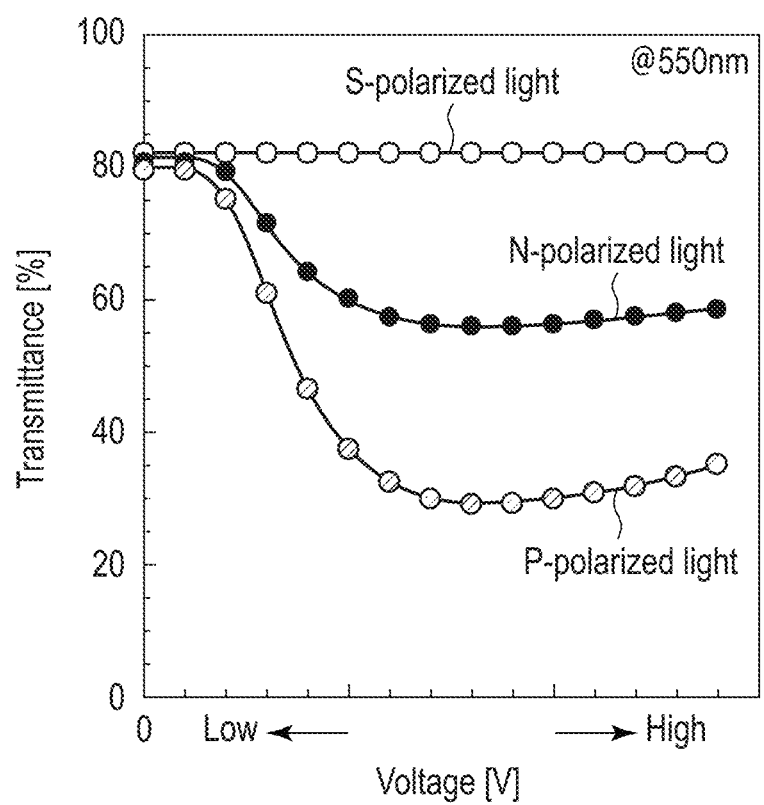
F I G. 26

ELECTRONIC DEVICE

CROSS-REFERENCE TO RELATED APPLICATIONS

This application is based upon and claims the benefit of priority from Japanese Patent Application No. 2022-029570, filed Feb. 28, 2022, the entire contents of which are incorporated herein by reference.

FIELD

Embodiments described herein relate generally to an electronic device.

BACKGROUND

Online conferences and the like have been prevalently spread, and an online conference system in which a camera and a personal computer are combined is frequently used in situations such as business, school, and meeting. However, a line of sight cannot be matched with a partner projected on a screen, and thus, degradation in communication quality is caused. This is because the camera is located outside a screen of a display panel such as a liquid crystal display panel or an organic electroluminescent (EL) display panel.

For example, in a case where a user looks at the face of the partner projected on the screen, the user cannot face the camera. In this case, the partner cannot match the line of sight with the user.

In contrast, in a case where the user faces the camera, the partner can match the line of sight with the user. However, the user cannot look the face of the partner projected on the screen.

BRIEF DESCRIPTION OF THE DRAWINGS

FIG. 6A is a cross-sectional view showing the display panel in a case where the liquid crystal layer is in the transparent state.

FIG. 6B is a cross-sectional view showing the display panel in a case where the liquid crystal layer is in the scattered state.

FIG. 11 is a diagram showing another example of the common voltage and the source line voltage in the transparent drive.

FIG. 15 is a plan view showing the display panel, is a diagram for describing the usage example of the electronic device, and is a diagram in which a second transparent voltage is applied to the liquid crystal layer, the display region (liquid crystal layer) of the display panel is set to a second transparent state, and a camera is viewed through the display panel.

FIG. 16 is a cross-sectional view showing the display panel in FIG. 15 along line XVI-XVI.

FIG. 17 is a circuit diagram showing a part of a gate driver and some gate lines shown in FIG. 4 and the like.

FIG. 20 is a plan view showing a display panel of an electronic device according to a second embodiment, and is a diagram for describing a usage example of the electronic device, and is a diagram in which a first transparent voltage is applied to a liquid crystal layer, a display region (liquid crystal layer) of the display panel is set to a first transparent state, and a camera is viewed through the display panel.

FIG. 21 is a cross-sectional view showing the display panel in FIG. 20 along line XXI-XXI.

FIG. 23 is a block diagram showing an electronic device according to a third embodiment using functional blocks.

FIG. 24 is an exploded perspective view showing a part of the electronic device according to the third embodiment, and is a diagram showing an alignment film, a liquid crystal layer, a polarizing element, and a camera.

FIG. 26 is a graph representing changes in transmittance with respect to voltage in S-polarized light, P-polarized light, and N-polarized light.

DETAILED DESCRIPTION

Figure 1:
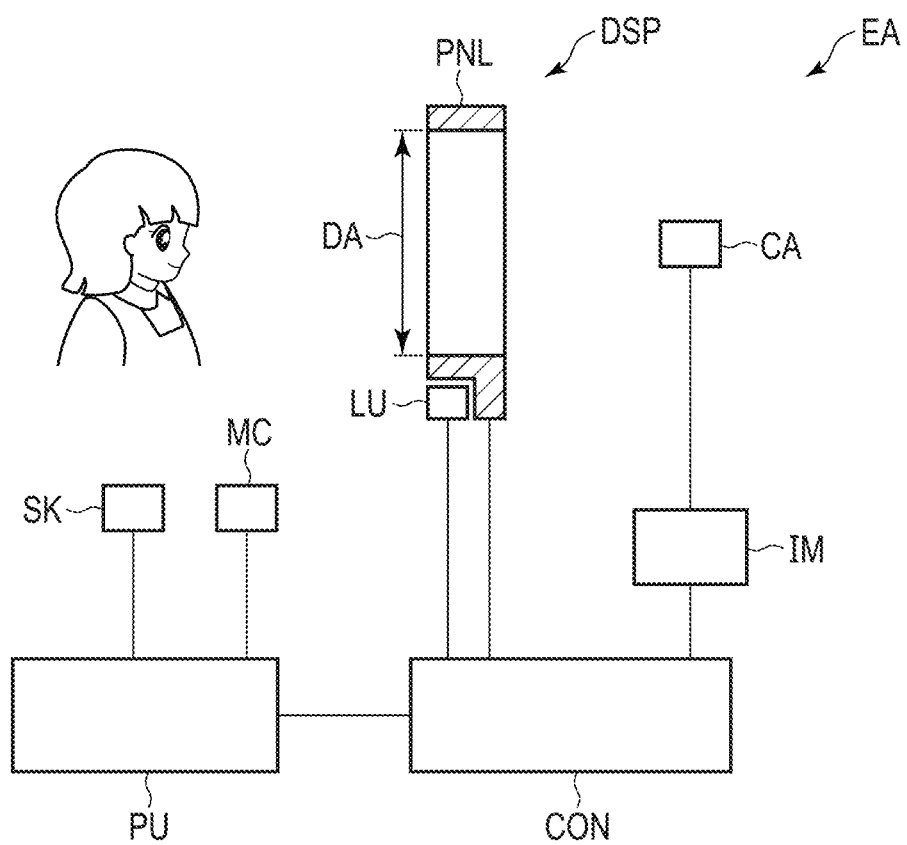
FIG. 1 is a block diagram showing an electronic device according to a first embodiment using functional blocks.

In general, according to one embodiment, there is provided an electronic device comprising: a display panel configured to display an image and including a display region that transmits external light; a light source unit located outside a region opposed to the display region of the display panel; a camera opposed to the display region of the display panel; and a control unit configured to control driving of the display panel, the light source unit, and the camera. The control unit is configured to in a light emission period, permit irradiation of light by the light source unit, irradiate the display region with light, display the image in the display region, and prohibit capturing by the camera, and in a capturing period independent of the light emission period, prohibit the irradiation of the light by the light source unit, set the display region to be transparent, permit the capturing by the camera, and take in the external light transmitted through the display region to the camera.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First, a basic concept of an embodiment of the present invention will be described.

In a case where a user of an electronic device including a display panel and a camera performs an online conference while using the camera, there is a problem that, in a case where the user looks at the face of a partner projected on a screen, the user cannot match a line of sight with the partner. This is because the online conference is captured by a camera located outside the screen. As a method for resolving such a problem, there is also a technology of drifting the line of sight of the partner by image processing and displaying an image on which the user matches the line of sight of the partner on the screen.

However, since there are problems in latency and processing accuracy, the user feels uncomfortable with the image.

In addition, the camera can be placed in front of the screen, but since the camera is put on the screen, the visibility of the image displayed on the screen is hindered by the camera.

Furthermore, the camera may be provided in the vicinity of a center of the display panel, the image may not be displayed in the vicinity of the center, and the vicinity of the center may be set as a region dedicated to capturing. However, there are a problem that an area in which the image can be displayed is reduced, a problem that the user feels uncomfortable when talking to the camera, and the like.

In addition, it is also conceivable to increase an aperture ratio by devising a layout of some pixels of an organic electroluminescent (EL) display panel and to capture the user through the screen of the organic EL display panel. However, the organic EL display panel has a complicated pixel circuit and requires a plurality of signal lines as compared with a liquid crystal display panel, and there is a problem that it is difficult to increase the aperture ratio of the organic EL display panel as high as an aperture ratio of the liquid crystal display panel.

As described above, a technical level for achieving the capturing of a subject (user) by the camera and the display of the image on the screen together has not reached a satisfactory level.

Thus, in the embodiment of the present invention, such a problem is improved, and it is possible to obtain an electronic device capable of capturing the subject over the screen and displaying the image on the screen.

For example, it is possible to use a technique in which an electronic device including a transparent liquid crystal display panel having a transmittance of 80% or more and a camera located behind the liquid crystal display panel as viewed from the user is used and driving of the liquid crystal display panel and capturing by the camera are synchronized with each other. As a result, the user can naturally direct their own line of sight toward the camera while matching the line of sight with the partner displayed on the screen.

As will be described later, it is necessary to pay attention to a capturing period by the camera. This is because the transparent liquid crystal display panel releases light incident from a light source unit not only to the user side but also to the camera side. The image displayed on the transparent liquid crystal display panel can be captured by the camera. Thus, in a period in which light is not incident on the transparent liquid crystal display panel from the light source unit, the subject may be captured through the transparent liquid crystal display panel by the camera. As a result, it possible to avoid a situation in which the image displayed by the transparent liquid crystal display panel is reflected in the image captured by the camera.

Incidentally, it is also possible to adopt a method for causing light to be incident on the transparent liquid crystal display panel from the light source unit, aiming at a period in which imaging is not performed in a camera imaging sequence.

Furthermore, in a case where degradation in image quality such as distortion occurs in the image captured by the camera due to a display state (a state of a liquid crystal layer) of the transparent liquid crystal display panel, it is possible to suppress the deterioration in the image quality by bringing a display region (liquid crystal layer) of the transparent liquid crystal display panel into a more transparent state or sandwiching a polarizing element between the transparent liquid crystal display panel and the camera.

Next, means and methods for improving the above problem will be described.

In each embodiment, an electronic device in which a polymer dispersed liquid crystal is applied to a display panel will be described. The electronic device of each embodiment can be used for various electronic devices such as a personal computer, a tablet terminal, and a smartphone.

First Embodiment

FIG. 1 is a block diagram showing an electronic device EA according to a first embodiment by using functional blocks. As shown in FIG. 1, the electronic device EA includes a display panel PNL, a light source unit LU, a camera CA, an imaging circuit IM, a control unit CON, a processing unit PU, a microphone MC, and a speaker SK.

The display panel PNL has a display region DA that displays an image and transmits external light. In the drawing, hatching is applied to regions of the display panel PNL other than the display region DA. The light source unit LU is located outside a region of the display panel PNL opposed to the display region DA. The display panel PNL and the light source unit LU are connected to the control unit CON.

The camera CA is opposed to the display region DA of the display panel PNL. The camera CA is connected to the control unit CON via the imaging circuit IM. The camera CA can capture a subject (user) through the display panel PNL.

The control unit CON can control driving of the display panel PNL, the light source unit LU, and the camera CA. The control unit CON can synchronize the driving of the display panel PNL, the light source unit LU, and the camera CA. The control unit CON, the display panel PNL, and the light source unit LU constitute a display device DSP. The control unit CON, the microphone MC, and the speaker SK are connected to the processing unit PU.

Figure 2:
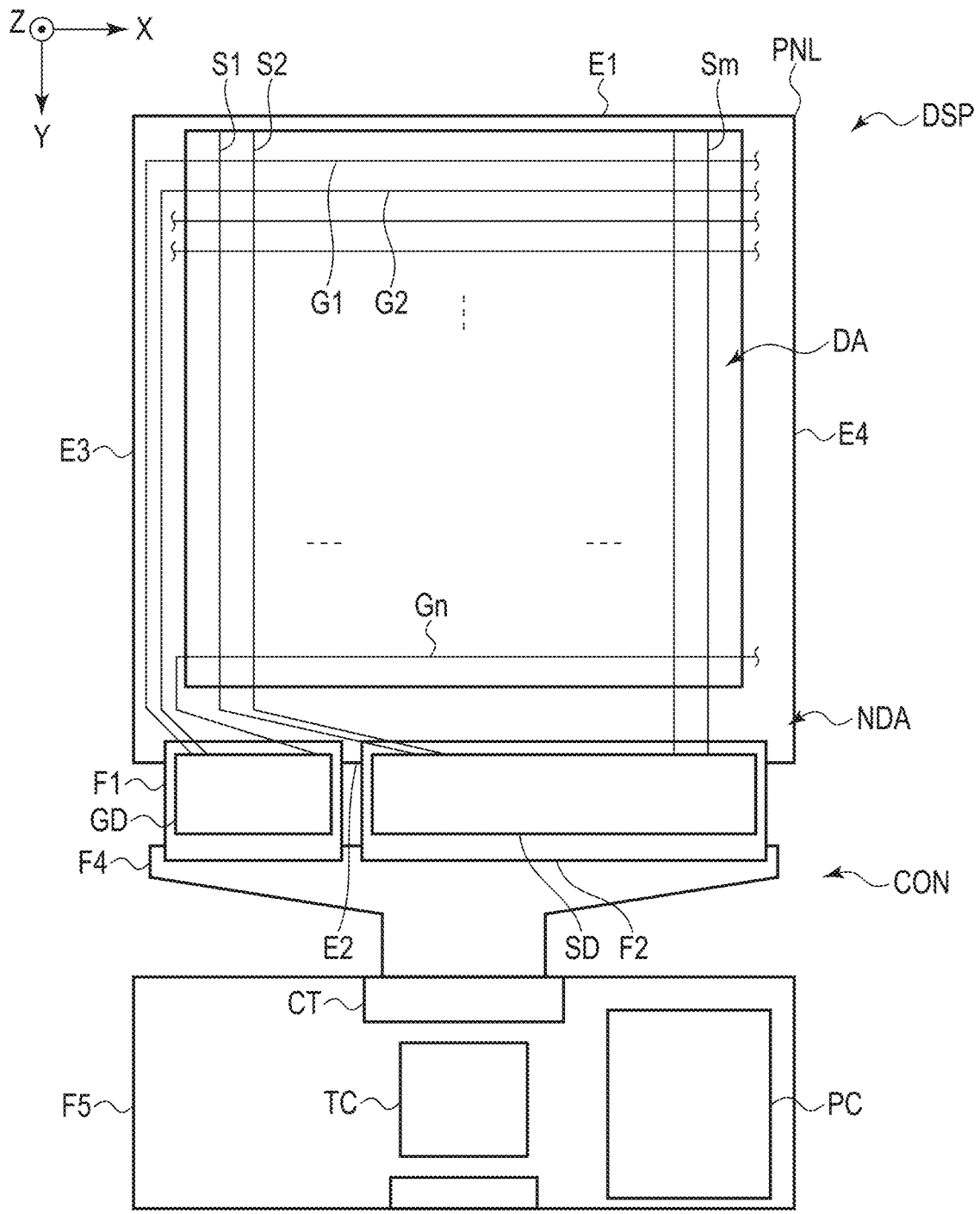
FIG. 2 is a plan view showing a configuration of a display device of the electronic device shown in FIG. 1.

FIG. 2 is a plan view showing a configuration of the display device DSP of the electronic device EA shown in FIG. 1.

As shown in FIG. 2, a first direction X and a second direction Y are directions intersecting each other, and a third direction Z is a direction intersecting the first direction X and the second direction Y. The first direction X corresponds to a row direction, and the second direction Y corresponds to a columnar direction. For example, the first direction X, the second direction Y, and the third direction Z are orthogonal to each other, but may intersect at an angle other than 90 degrees. In the present specification, a direction toward a distal part of an arrow indicating the third direction Z is referred to as upward (or, simply above) or forward, and a direction opposite to the distal part of the arrow is referred to as downward (or, simply below) or backward.

The display device DSP includes the display panel PNL, wiring boards F1, F2, F4, and F5, and the like. The display panel PNL includes the display region DA for displaying an image and a frame-shaped non-display region NDA surrounding the display region DA. The display region DA includes n gate lines G (G1 to Gn), m source lines S (S1 to Sm), and the like. Incidentally, both n and m are positive integers, and n may be equal to m, or n may be different from m. The plurality of gate lines G extend in the first direction X and are arranged to be spaced apart in the second direction Y. In other words, the plurality of gate lines G extend in the row direction. The plurality of source lines S extend in the second direction Y and are arranged to be spaced apart in the first direction X. The display panel PNL includes end portions E1 and E2 along the first direction X and end portions E3 and E4 along the second direction Y.

The wiring board F1 includes a gate driver GD. The plurality of gate lines G are connected to the gate driver GD. The wiring board F2 includes a source driver SD. The plurality of source lines S are connected to the source driver SD. The wiring boards F1 and F2 are connected to the display panel PNL and the wiring board F4. The wiring board F5 includes a timing controller TC, a power supply circuit PC, and the like. The wiring board F4 is connected to a connector CT of the wiring board F5. Incidentally, the wiring boards F1 and F2 may be replaced with a single wiring board. In addition, the wiring boards F1, F2, and F4 may be replaced with a single wiring board. The gate driver GD, the source driver SD, and the timing controller TC described above constitute the control unit CON of the present embodiment, and the control unit CON is configured to control driving of the plurality of gate lines G, the plurality of source lines S, a plurality of pixel electrodes to be described later, a common electrode to be described later, the light source unit LU, and the camera CA.

Figure 3:
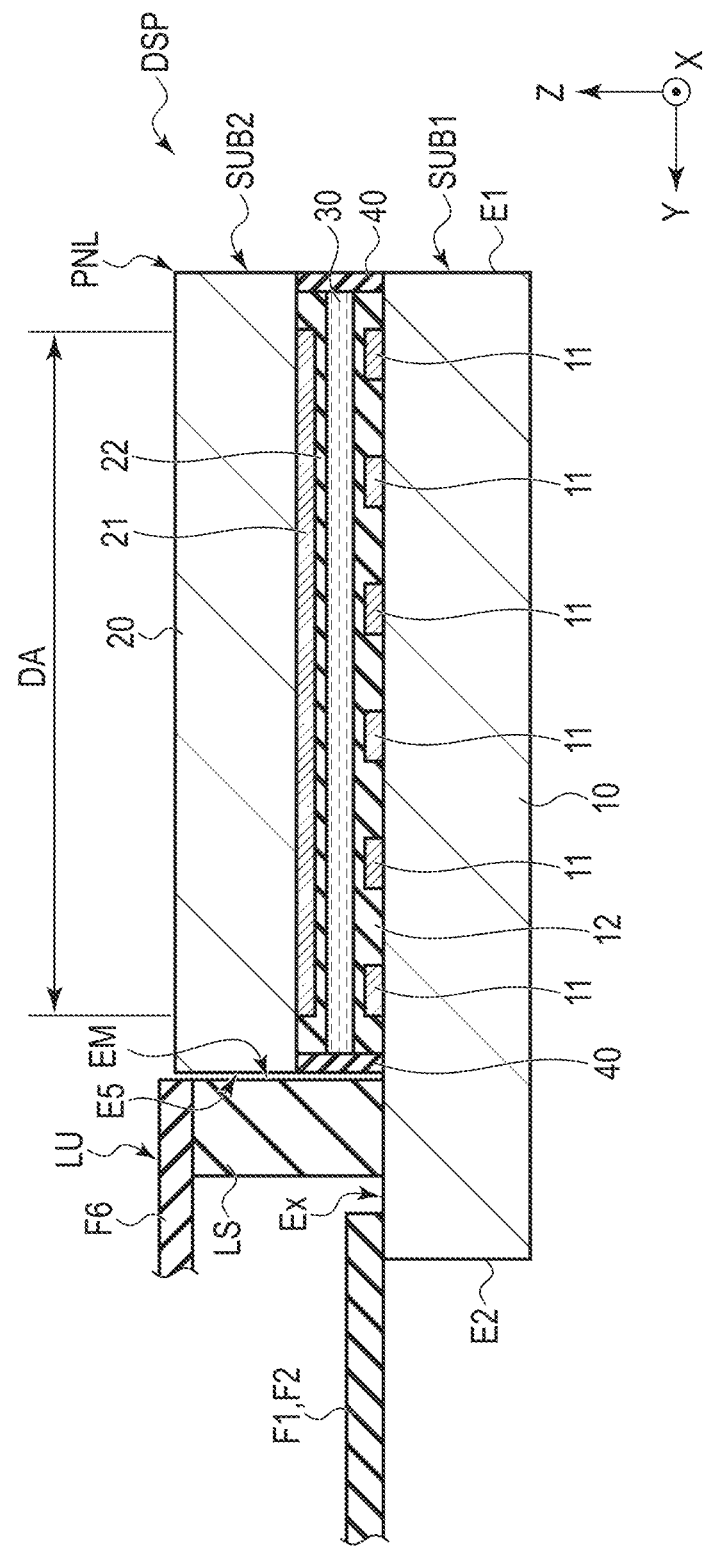
FIG. 3 is a cross-sectional view of the display device shown in FIG. 2.

FIG. 3 is a cross-sectional view of the display device DSP shown in FIG. 2. Here, only main parts will be described in a cross section of the display device DSP on a Y-Z plane defined by the second direction Y and the third direction Z.

As shown in FIG. 3, the display panel PNL includes a first substrate SUB1, a second substrate SUB2, a liquid crystal layer 30 as a display function layer, and the like.

The first substrate SUB1 includes a transparent substrate 10, a plurality of pixel electrodes 11, an alignment film 12, and the like. The second substrate SUB2 includes a transparent substrate 20, a common electrode 21, an alignment film 22, and the like. The plurality of pixel electrodes 11 and the common electrode 21 are made of, for example, a transparent conductive material such as indium tin oxide (ITO) or indium zinc oxide (IZO), and are located in the display region DA. The alignment film 12 and the alignment film 22 are in contact with the liquid crystal layer 30.

The liquid crystal layer 30 is located at least in the display region DA. The liquid crystal layer 30 includes a polymer dispersed liquid crystal, and is held between the first substrate SUB1 and the second substrate SUB2. The liquid crystal layer 30 of the present embodiment uses reverse mode polymer dispersed liquid crystal (R-PDLC). The liquid crystal layer 30 maintains the parallelism of light to be incident in a case where a voltage to be applied is low, and scatters the light to be incident in a case where the voltage to be applied is high.

The first substrate SUB1 and the second substrate SUB2 are bonded by a sealing material 40. The first substrate SUB1 has an extended portion EX extended in the second direction Y from an end portion E5 of the transparent substrate 20.

The wiring boards F1 and F2 are connected to the extended portion EX of the first substrate SUB1.

The light source unit LU is located in the non-display region NDA outside the display region DA. The light source unit LU includes a light emitting element LS, a wiring board F6, and the like. The light emitting element LS is connected to the wiring board F6 and is located on the extended portion EX. The light emitting element LS includes a light emitting portion (light-emitting surface) EM opposed to the end portion E5. Illumination light emitted from the light emitting portion EM is incident on the end portion E5 and propagates through the display panel PNL as will be described later.

Figure 4:
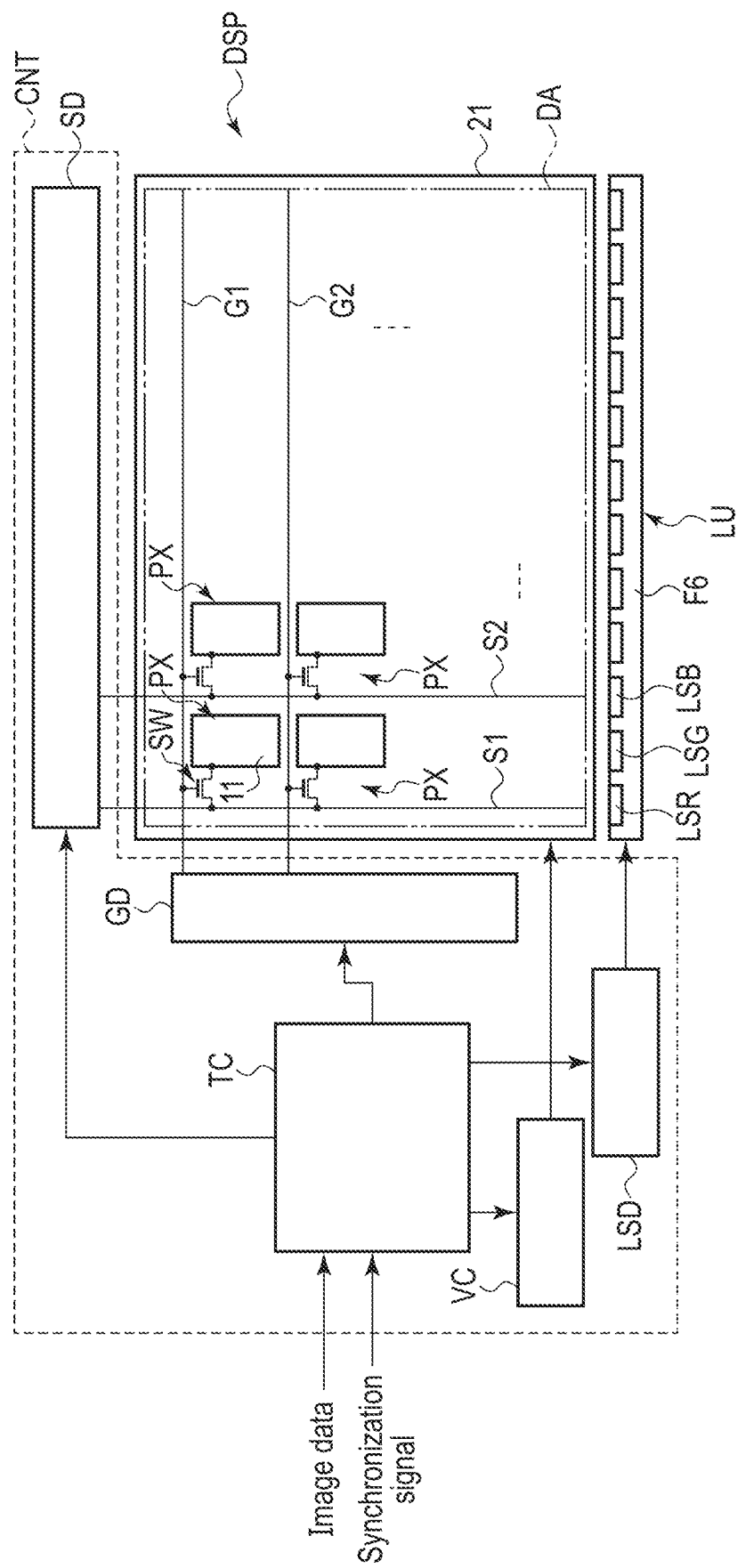
FIG. 4 is a diagram showing main components of the display device shown in FIG. 2.

FIG. 4 is a diagram showing main components of the display device DSP shown in FIG. 2.

As shown in FIG. 4, the display device DSP includes a controller CNT indicated by a dashed line in the drawing. The controller CNT includes a timing controller TC, a gate driver GD, a source driver SD, a Vcom circuit VC, a light source driver LSD, and the like.

The timing controller TC generates various signals based on image data input from the outside, a synchronization signal, and the like. For example, the timing controller TC outputs a video signal generated by performing predetermined signal processing to the source driver SD based on the image data. In addition, the timing controller TC outputs a control signal generated based on the synchronization signal to each of the gate driver GD, the source driver SD, the Vcom circuit VC, and the light source driver LSD. Details of the timing controller TC will be described later.

The display region DA indicated by a dashed double-dotted line in the drawing includes a plurality of pixels PX. Each pixel PX includes a switching element SW and a pixel electrode 11. The switching element SW is formed of, for example, a thin-film transistor. The switching element SW is electrically connected to a gate line G and a source line S. The plurality of pixel electrodes 11 are located in the display region DA and are provided in a matrix. For this reason, for example, the plurality of pixel electrodes 11 are provided in a plurality of rows. The pixel electrodes 11 are connected to the source line S through the switching element SW. The common electrode 21 is located in the display region DA. The common electrode 21 is opposed to the plurality of pixel electrodes 11. Incidentally, unlike the present embodiment, the common electrode 21 may be divided every at least one pixel PX, may be connected to a common line, and may be applied with a common voltage.

A gate signal is supplied from the gate driver GD to each of the gate lines G. A video signal (image signal) is supplied from the source driver SD to each of the source lines S. A common voltage Vcom is supplied from the Vcom circuit VC to the common electrode 21. The video signal supplied to the source line S is applied to the pixel electrode 11 connected to the switching element SW in a period in which the switching element SW enters a conduction state based on the gate signal supplied to the gate line G. In the following description, giving the video signal to the pixel electrode 11 to form an electric potential difference between the pixel electrode 11 and the common electrode 21 may be referred to as writing the video signal (or, applying the voltage) to the pixel PX including the pixel electrode 11.

The light source unit LU is configured to irradiate the liquid crystal layer 30 with light. In the present embodiment, the light source unit LU is configured to irradiate the liquid crystal layer 30 with light of color other than achromatic color. The light source unit LU includes light emitting elements LS of a plurality of colors. For example, the light source unit LU includes a light emitting element (first light emitting element) LSR that irradiates the liquid crystal layer 30 with light of a first color, a light emitting element (second light emitting element) LSG that irradiates the liquid crystal layer 30 with light of a second color, and a light emitting element (third light emitting element) LSB that irradiates the liquid crystal layer 30 with light of a third color. It goes without saying that the first color, the second color, and the third color are different from each other. In the present embodiment, the first color is red, the second color is green, and the third color is blue.

The light source driver LSD controls turn-on periods of the light emitting elements LSR, LSG, and LSB. As will be described in detail later, in a drive scheme in which one frame period has a plurality of sub-frame periods, at least one of three light emitting elements LSR, LSG, and LSB is turned on in each sub-frame, and color of the illumination light is switched for each sub-frame.

Hereinafter, a configuration example of a display device including the liquid crystal layer 30 which is a polymer dispersed liquid crystal layer will be described.

Figure 5A:
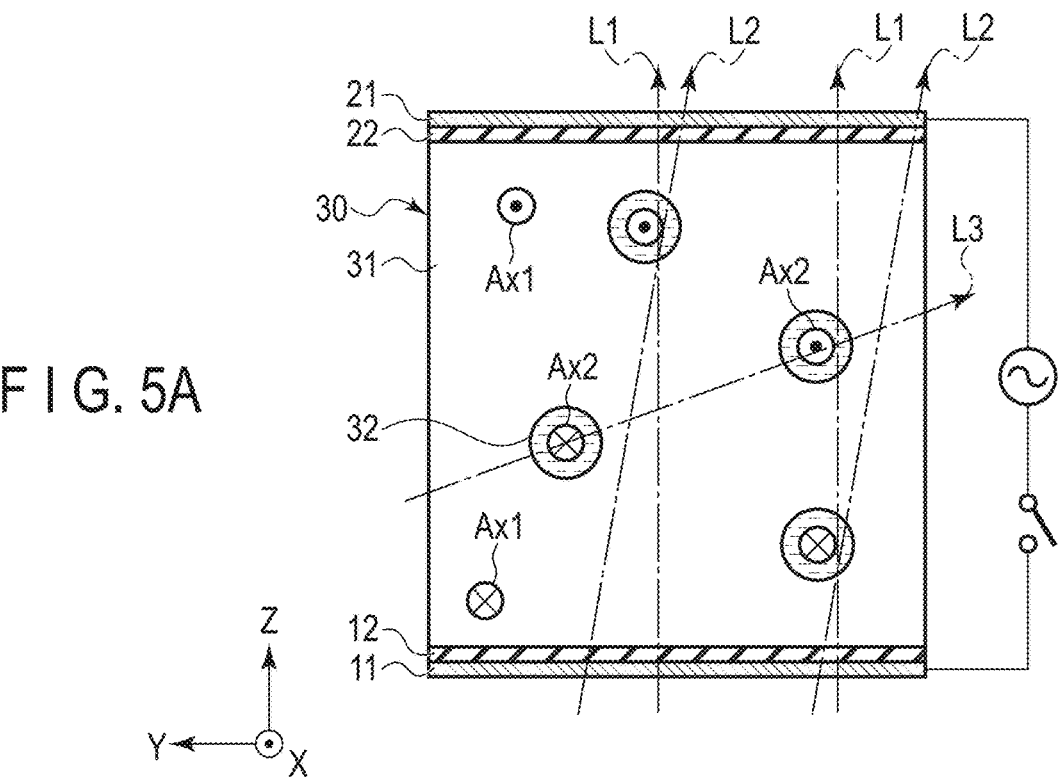
FIG. 5A is a diagram schematically showing a liquid crystal layer in a transparent state.

FIG. 5A is a diagram schematically showing the liquid crystal layer 30 in a transparent state.

As shown in FIG. 5A, the liquid crystal layer 30 includes a liquid crystalline polymer 31 and liquid crystalline molecules 32. The liquid crystalline polymer 31 is obtained, for example, by polymerizing a liquid crystalline monomer in a state where the liquid crystalline monomer is aligned in a predetermined direction by alignment restriction force of the alignment films 12 and 22. The liquid crystalline molecules 32 are dispersed within the liquid crystalline monomer, and are aligned in a predetermined direction depending on an alignment direction of the liquid crystalline monomer when the liquid crystalline monomer is polymerized. In the present embodiment, the alignment films 12 and 22 are horizontal alignment films that initially align the liquid crystalline monomer and the liquid crystalline molecules 32 along an X-Y plane defined by the first direction X and the second direction Y. The liquid crystalline molecules 32 are positive liquid crystalline molecules having positive dielectric anisotropy.

However, unlike the present embodiment, the alignment films 12 and 22 may be vertical alignment films that initially align the liquid crystalline monomer and the liquid crystalline molecules 32 along the third direction Z. In addition, the liquid crystalline molecules 32 may be negative liquid crystalline molecules having negative dielectric anisotropy.

The liquid crystalline polymer 31 and the liquid crystalline molecules 32 have equal optical anisotropy. Alternatively, the liquid crystalline polymer 31 and the liquid crystalline molecules 32 have approximately equal refractive anisotropy. In other words, an ordinary refractive index and an extraordinary refractive index of each of the liquid crystalline polymer 31 and the liquid crystalline molecules 32 are approximately equal to each other. Incidentally, for both the ordinary refractive index and the extraordinary refractive index, values of the liquid crystalline polymer 31 and the liquid crystalline molecules 32 may not completely match each other, and a deviation caused by an error in manufacturing or the like is allowed. In addition, responsiveness to an electric field of each of the liquid crystalline polymer 31 and the liquid crystalline molecules 32 is different. That is, the responsiveness of the liquid crystalline polymer 31 to the electric field is lower than the responsiveness of the liquid crystalline molecules 32 to the electric field.

The example shown in FIG. 5A corresponds to, for example, a state where a voltage is not applied to the liquid crystal layer 30 (a state where an electric potential difference between the pixel electrode 11 and the common electrode 21 is zero) or a state where a second transparent voltage to be described later is applied to the liquid crystal layer 30.

As shown in FIG. 5A, an optical axis Ax1 of the liquid crystalline polymer 31 and an optical axis Ax2 of the liquid crystalline molecules 32 are parallel to each other. In the example illustrated, both the optical axis Ax1 and the optical axis Ax2 are parallel to the first direction X. The optical axis mentioned herein corresponds to a line parallel to a direction of travel of a light beam such that a refractive index becomes one value regardless of a polarization direction.

As described above, since the liquid crystalline polymer 31 and the liquid crystalline molecules 32 have approximately equal refractive anisotropy and the optical axes Ax1 and Ax2 are parallel to each other, there is almost no refractive index difference between the liquid crystalline polymer 31 and the liquid crystalline molecules 32 in all directions including the first direction X, the second direction Y, and the third direction Z. For this reason, light L1 incident on the liquid crystal layer 30 in the third direction Z is transmitted without being substantially scattered in the liquid crystal layer 30. The liquid crystal layer 30 can maintain the parallelism of the light L1. Similarly, light L2 and light L3 incident in an oblique direction angled with respect to the third direction Z are hardly scattered in the liquid crystal layer 30. For this reason, high transparency is obtained. The state shown in FIG. 5A is referred to as a "transparent state".

Figure 5B:
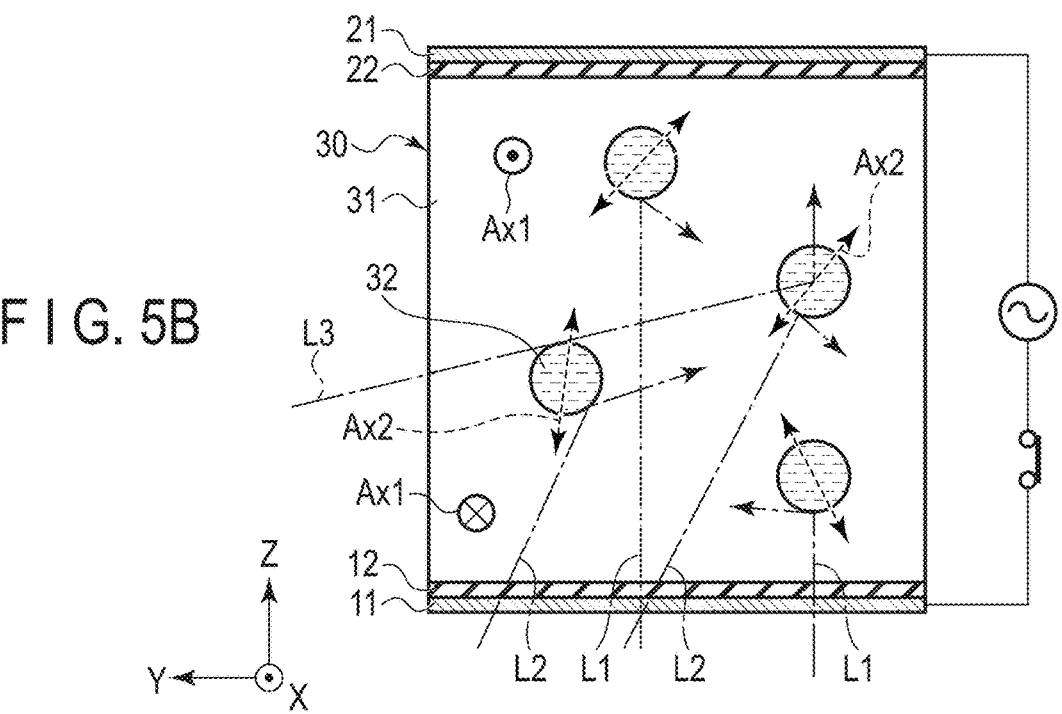
FIG. 5B is a diagram schematically showing a liquid crystal layer in a scattered state.

FIG. 5B is a diagram schematically showing the liquid crystal layer 30 in a scattered state.

As shown in FIG. 5B, as described above, the responsiveness of the liquid crystalline polymer 31 to the electric field is lower than the responsiveness of the liquid crystalline molecule 32 to the electric field. For this reason, in a state where a voltage (scattering voltage to be described later) higher than each of the second transparent voltage and a first transparent voltage to be described later is applied to the liquid crystal layer 30, the alignment direction of the liquid crystalline polymer 31 hardly changes, whereas the alignment direction of the liquid crystalline molecules 32 changes in accordance with the electric field. In other words, as shown in the drawing, the optical axis Ax1 is almost parallel to the first direction X, whereas the optical axis Ax2 is angled with respect to the first direction X. For this reason, the optical axes Ax1 and Ax2 intersect each other. Accordingly, there is a large refractive index difference between the liquid crystalline polymer 31 and the liquid crystalline molecules 32 in all directions including the first direction X, the second direction Y, and the third direction Z. As a result, the light beams L1 to L3 incident on the liquid crystal layer 30 are scattered in the liquid crystal layer 30. The state shown in FIG. 5B is referred to as a "scattered state".

The control unit CON switches the liquid crystal layer 30 to at least one of the transparent state and the scattered state.

FIG. 6A is a cross-sectional view showing the display panel PNL in a case where the liquid crystal layer 30 is in the transparent state. As shown in FIG. 6A, illumination light L11 emitted from the light emitting element LS is incident on the display panel PNL from the end portion E5, and propagates through the transparent substrate 20, the liquid crystal layer 30, the transparent substrate 10, and the like. In a case where the liquid crystal layer 30 is in the transparent state, since the illumination light L11 is hardly scattered by the liquid crystal layer 30, the illumination light hardly leaks from a lower surface 10B of the transparent substrate 10 and an upper surface 20T of the transparent substrate 20.

An external light beam (external light) L12 incident on the display panel PNL is transmitted with hardly scattered in the liquid crystal layer 30. In other words, the external light beam incident on the display panel PNL from the lower surface 10B is transmitted to the upper surface 20T, and the external light beam incident from the upper surface 20T is transmitted to the lower surface 10B. For this reason, in a case where the display panel PNL is observed from the upper surface 20T side, the user can visually recognize a background on the lower surface 10B side through the display panel PNL. Similarly, in a case where the camera CA captures the display panel PNL from the lower surface 10B side, the subject on the upper surface 20T side can be captured through the display panel PNL.

FIG. 6B is a cross-sectional view showing the display panel PNL in a case where the liquid crystal layer 30 is in the scattered state. As shown in FIG. 6B, illumination light L21 emitted from the light emitting element LS is incident on the display panel PNL from the end portion E5, and propagates through the transparent substrate 20, the liquid crystal layer 30, the transparent substrate 10, and the like. In the example illustrated, since the liquid crystal layer 30 between a pixel electrode 11a and the common electrode 21 (a liquid crystal region to which a voltage to be applied between the pixel electrode 11α and the common electrode 21 is applied) is in the transparent state, the illumination light L21 is hardly scattered in the liquid crystal region opposed to the pixel electrode 11α in the liquid crystal layer 30. In contrast, since the liquid crystal layer 30 between a pixel electrode 11β and the common electrode 21 (a liquid crystal region to which a voltage to be applied between the pixel electrode 11β and the common electrode 21 is applied) is in the scattered state, the illumination light L21 is scattered in the liquid crystal region of the liquid crystal layer 30 opposed to the pixel electrode 11β. Of the illumination light L21, a part of scattered light L211 is released from the upper surface 20T to the outside, and a part of scattered light L212 is released from the lower surface 10B to the outside.

At a position overlapping the pixel electrode 11a, an external light beam L22 incident on the display panel PNL is transmitted with hardly scattered in the liquid crystal layer 30, similarly to the external light beam L12 shown in FIG. 6A. At a position overlapping the pixel electrode 11β, an external light beam L23 incident from the lower surface 10B is transmitted from the upper surface 20T after light L231 as a part thereof is scattered in the liquid crystal layer 30. In addition, an external light beam L24 incident from the upper surface 20T is transmitted from the lower surface 10B after light L241 as a part thereof is scattered in the liquid crystal layer 30.

For this reason, in a case where the display panel PNL is observed from the upper surface 20T side, color of the illumination light L21 can be visually recognized at the position overlapping the pixel electrode 11β. In addition, since a part of an external light beam L231 is transmitted through the display panel PNL, the background on the lower surface 10B side can be visually recognized through the display panel PNL. Similarly, in a case where the display panel PNL is captured by the camera CA from the lower surface 10B side, since the camera CA detects the color of the illumination light L21 at the position overlapping the pixel electrode 11β, it is necessary to pay attention to capturing.

In addition, since a part of an external light beam L241 is transmitted through the display panel PNL, in a case where the display panel PNL is captured by the camera CA from the lower surface 10B side, the subject on the upper surface 20T side can be captured through the display panel PNL. Incidentally, since the liquid crystal layer 30 is in the transparent state at the position overlapping the pixel electrode 11α, the color of the illumination light L21 is hardly visually recognized, and the subject can be captured through the display panel PNL.

Figure 7:
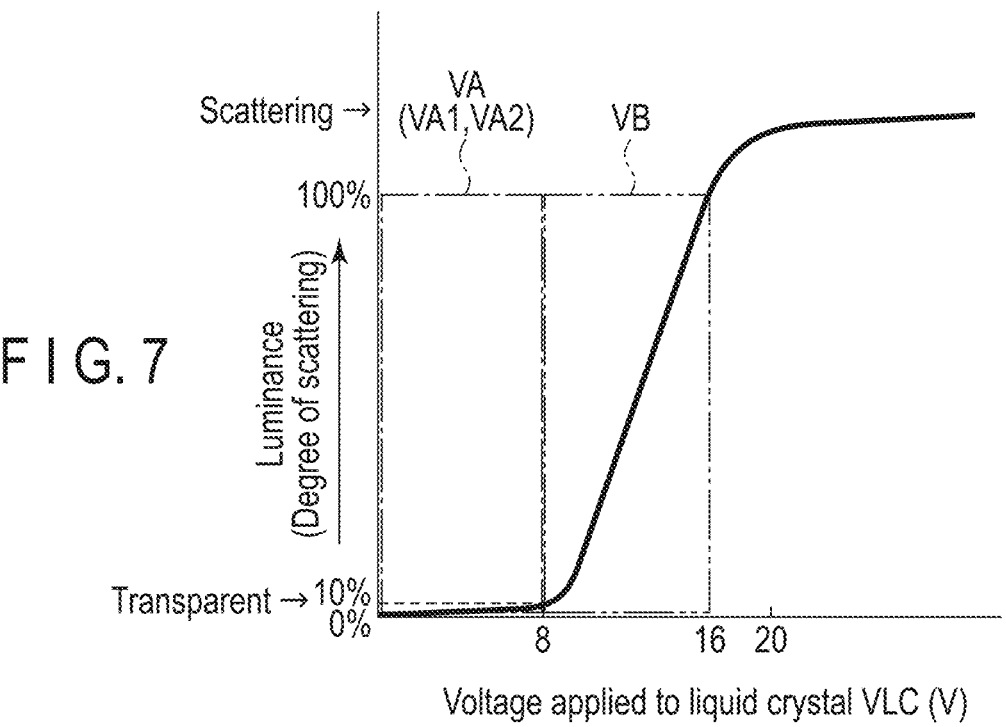
FIG. 7 is a graph representing scattering characteristics of the liquid crystal layer.

FIG. 7 is a graph representing scattering characteristics of the liquid crystal layer 30, and illustrates a relationship between a voltage VLC applied to the liquid crystal layer 30 and luminance. The luminance mentioned herein corresponds to luminance of the scattered light L211 obtained when the illumination light L21 emitted from the light emitting element LS is scattered in the liquid crystal layer 30, for example, as shown in FIG. 6B. From another point of view, this luminance represents a degree of scattering of the liquid crystal layer 30.

As shown in FIG. 7, when the voltage VLC is increased from 0 V, the luminance rapidly increases from about 8 V and is saturated at about 20 V. Incidentally, the luminance slightly increases even though the voltage VLC is between 0 V and 8 V. In the present embodiment, a voltage in a region surrounded by a dashed double-dotted line, that is, in a range of 8 V to 16 V is used for gradation reproduction (for example, 256 gradations) of each pixel PX. Hereinafter, a voltage of $8\ V<VLC\leq16\ V$ is referred to as a "scattering voltage". In addition, in the present embodiment, a region surrounded by a dashed dotted line, that is, a voltage of $0\ V\leq VLC\leq8\ V$ is referred to as a "transparent voltage". The transparent voltage VA includes a first transparent voltage VA1 and a second transparent voltage VA2 described above. Incidentally, a lower limit value and an upper limit value of a scattering voltage VB and the transparent voltage VA are not limited to this example, and can be appropriately determined in accordance with the scattering characteristics of the liquid crystal layer 30.

Here, a degree of scattering in a case where a degree of scattering of light to be incident on the liquid crystal layer 30 is the highest when the scattering voltage VB is applied to the liquid crystal layer 30 is set to 100%. Here, a degree of scattering when the scattering voltage VB of 16 V is applied to the liquid crystal layer 30 is 100%. For example, the transparent voltage VA can be defined as a range of the voltage VLC at which the degree of scattering (luminance) is less than 10%. Alternatively, the transparent voltage VA can also be defined as a voltage VLC less than or equal to a voltage corresponding to a lowest gradation (8 V in the example of FIG. 7).

In addition, the transparent voltage VA (the first transparent voltage VA1 and the second transparent voltage VA2) may be different from the example shown in FIG. 7. For example, the first transparent voltage VA1 may be a voltage at which the degree of scattering is in a range of 10% or more and 50% or less. In addition, the second transparent voltage VA2 may be a voltage at which the degree of scattering is in a range of less than 10%. Furthermore, the first transparent voltage VA1 may be matched with the second transparent voltage VA2 such that the first transparent voltage VA1 is a voltage at which the degree of scattering is in a range of less than 10%.

Incidentally, the graph represented in FIG. 7 is applicable to a case where polarity of the voltage to be applied to the liquid crystal layer 30 is positive polarity (+) and a case where the polarity is negative polarity (−). In the latter case, the voltage VLC is an absolute value of a negative-polarity voltage.

Figure 8A:
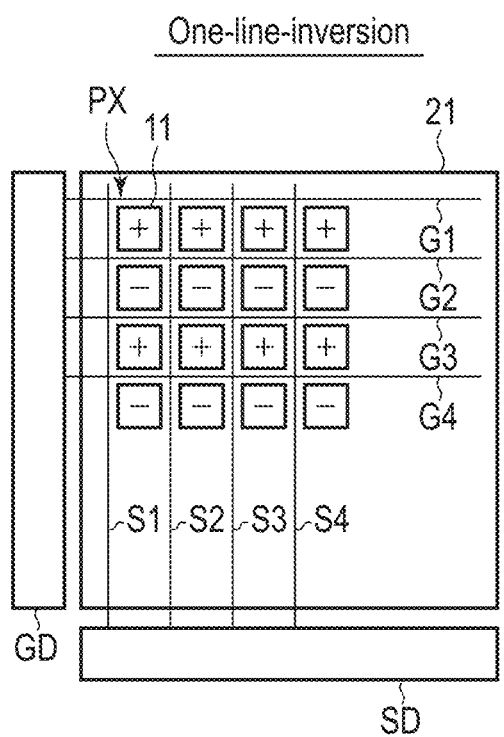
FIG. 8A is a diagram showing an outline of a one-line-inversion drive scheme.
Figure 8B:
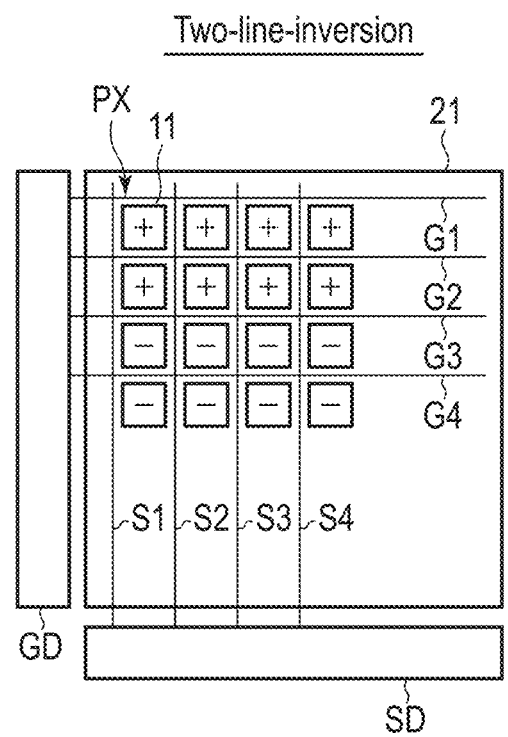
FIG. 8B is a diagram showing an outline of a two-line-inversion drive scheme.
Figure 8C:
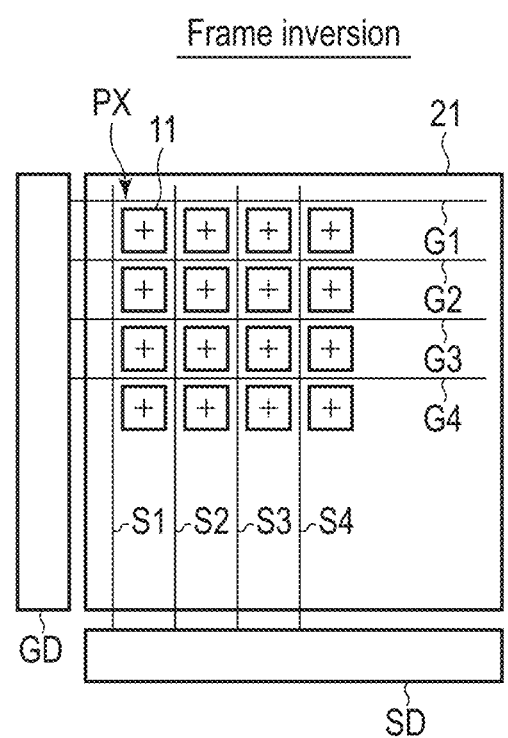
FIG. 8C is a diagram showing an outline of a frame-inversion drive scheme.

A polarity inversion drive scheme for inverting the polarity of the voltage to be applied to the liquid crystal layer 30 can be applied to the display device DSP. FIGS. 8A, 8B, and 8C are diagrams showing outlines of the polarity inversion drive scheme.

FIG. 8A represents a one-line-inversion drive scheme in which the voltage to be applied to liquid crystal layer 30 (the voltage written to the pixel PX) is inverted between the positive polarity (+) and the negative polarity (−) for each group of pixels PX (one line) connected to one gate line G. In such a drive scheme, for example, polarity of the common voltage to be supplied to the common electrode 21 and polarity (polarity of a source line voltage) of the video signal to be supplied from the source driver SD to the source line S are inverted for each horizontal period in which the gate driver GD supplies the gate signal to the gate line G. In the same horizontal period, the polarity of the common voltage and the polarity of the video signal are, for example, opposite to each other.

FIG. 8B represents a two-line-inversion drive scheme in which the voltage to be applied to the liquid crystal layer 30 is inverted between the positive polarity (+) and the negative polarity (−) every two lines. The present invention is not limited to the example of FIGS. 8A and 8B, and the polarity may be inverted every three or more lines.

FIG. 8C represents a frame-inversion drive scheme in which the voltage to be applied to the liquid crystal layer 30 is inverted between the positive polarity (+) and the negative polarity (−) for each frame period in which an image corresponding to one piece of image data is displayed. In such a drive method, for example, the polarity of the common voltage and the polarity of the video signal are inverted for each frame period. In the same frame period, the polarity of the common voltage and the polarity of the video signal are, for example, opposite to each other. The present invention is not limited to the example of FIG. 8C, and the polarity may be inverted for each sub-frame.

Figure 9:
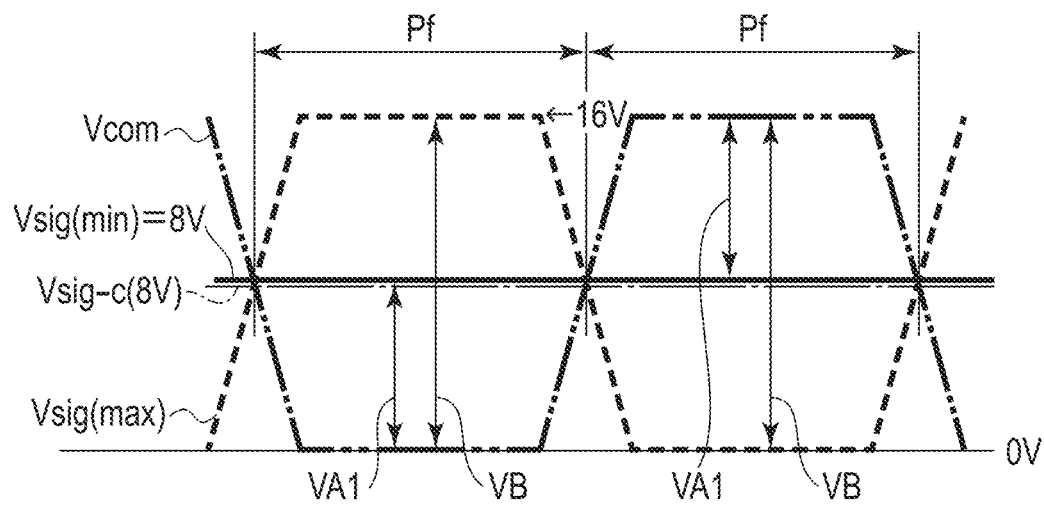
FIG. 9 is a diagram showing an example of a common voltage and a source line voltage in display drive.

FIG. 9 is a diagram showing an example of a common voltage Vcom to be supplied to the common electrode 21 and a source line voltage Vsig to be supplied to the source line S (or, pixel electrode 11) in display drive to which the one-line-inversion drive scheme in FIG. 8A is applied.

As shown in FIG. 9, the source line voltage Vsig indicates a waveform corresponding to a maximum value (max) of the gradation and a waveform corresponding to a minimum value (min) of the gradation. Here, a waveform of the source line voltage Vsig (min) is indicated by a solid line, a waveform of the common voltage Vcom is indicated by a dashed double-dotted line, and a waveform of the source line voltage Vsig (max) is indicated by a dashed line. In the example of the drawing, the common voltage Vcom and the source line voltage Vsig (see the waveform of the maximum value) are inverted in polarity for each frame period Pf. A reference voltage Vsig-c is, for example, 8 V. In each of the common voltage Vcom and the source line voltage Vsig, a lower limit value is 0 V, and an upper limit value is 16 V.

However, in a case where the frame period Pf includes a plurality of sub-frame periods, the polarity of the common voltage Vcom and the polarity of the source line voltage Vsig may be inverted every one frame period Pf, or may be inverted every one field period (one sub-frame period).

Focusing on the polarity inversion drive scheme including the example of FIG. 10 to be described later without being limited to the example of FIG. 9, in a case where a drive voltage (a voltage to be written to the pixel PX) to be applied to the liquid crystal layer 30 is positive polarity, a difference (Vsig−Vcom) between the source line voltage Vsig and the common voltage Vcom becomes 0 V or a positive voltage value. In contrast, in a case where the drive voltage to be applied to the liquid crystal layer 30 (the voltage written to the pixel PX) is negative, the difference (Vsig−Vcom) between the source line voltage Vsig and the common voltage Vcom is 0 V or a negative voltage value.

Focusing on the polarity inversion drive scheme shown in FIG. 9, in a period in which the positive-polarity voltage is written to the pixel PX, the common voltage Vcom becomes 0 V, and the source line voltage Vsig becomes a voltage value corresponding to a gradation indicated by image data in a range of 8 V or more and 16 V or less. In contrast, in a period in which the negative-polarity voltage is written to the pixel PX, the common voltage Vcom becomes 16 V, and the source line voltage Vsig becomes a voltage value corresponding to a gradation indicated by image data in a range of 0 V or more and 8 V or less. That is, in any case, a voltage of 8 V or more and 16 V or less is applied between the common electrode 21 and the pixel electrode 11.

As shown in FIG. 7, even though the voltage VLC to be applied to the liquid crystal layer 30 is 8 V, in other words, even though the first transparent voltage VA1 is applied to the liquid crystal layer 30, the liquid crystal layer 30 has a degree of scattering of about 0% to 10%. Accordingly, even in a case where the source line voltage Vsig is set to the minimum value of the gradation, the external light beam incident on the display panel PNL is slightly scattered, and the visibility of a background of the display panel PNL may degrade.

For this reason, as will be described later, the visibility of the background of the display panel PNL can be improved by incorporating transparent driving (driving in a reset period to be described later) for setting a voltage between the pixel electrode 11 and the common electrode 21 to be smaller than, for example, a lower limit value of the gradation into a sequence of image display. Furthermore, the camera CA can more clearly capture the subject through the display panel PNL.

Here, a relationship between an output of the source driver SD and the common voltage Vcom will be described.

In a case where a withstand voltage of the source driver SD is low, the common voltage Vcom is inversely driven to increase a liquid crystal application voltage. At this time, the source driver SD can simultaneously output only one of the positive-polarity source line voltage Vsig (for example, reference voltage Vsig-c to 16 V) and the negative-polarity source line voltage Vsig (for example, 0 V to reference voltage Vsig-c). In addition, the polarity of the common voltage Vcom is opposite to the output of the source driver SD.

However, in a case where the source driver SD having the high withstand voltage is used, a relationship between the source line voltage Vsig and the common voltage Vcom may be the relationship described above, but may be the following relationship. That is, the common voltage Vcom is fixed to 0 V, and the source line voltage Vsig output from the source driver SD ranges from 0 V to +16 V in the positive polarity, and ranges from −16 V to 0 V in the negative polarity.

Figure 10:
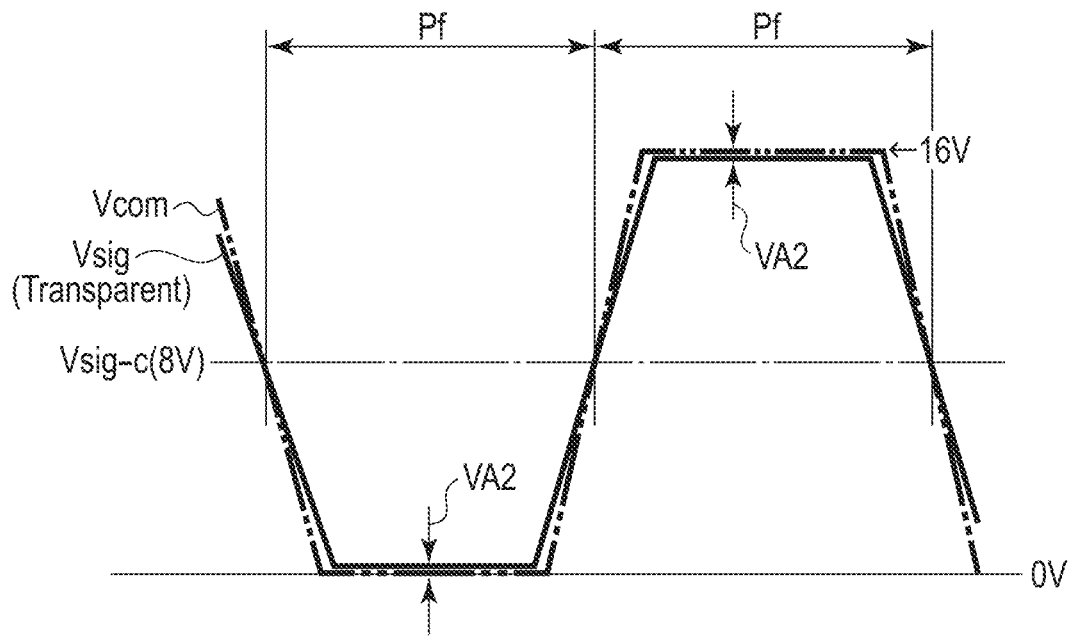
FIG. 10 is a diagram showing an example of the common voltage and the source line voltage in transparent drive.

FIG. 10 is a diagram showing an example of the common voltage Vcom and the source line voltage Vsig in the transparent driving. Here, the waveform of the source line voltage Vsig is indicated by a solid line, and the waveform of the common voltage Vcom is indicated by a dashed double-dotted line.

As shown in FIG. 10, similarly to the example of FIG. 9, the common voltage Vcom is alternately switched to 0 V and 16 V for each frame period Pf. In the transparent driving, a voltage value of the source line voltage Vsig matches the common voltage Vcom (Vsig=Vcom=0 V or Vsig=Vcom=16 V) for each frame period Pf. Incidentally, in FIG. 10, the source line voltage Vsig and the common voltage Vcom are slightly deviated from each other due to the illustrated relationship. For this reason, 0 V is applied to the liquid crystal layer 30. In other words, the second transparent voltage VA2 is applied to the liquid crystal layer 30.

However, the source line voltage Vsig in the transparent driving is not limited to the example shown in FIG. 10. For example, in a period in which the common voltage Vcom becomes 0 V, the source line voltage Vsig may become more than 0 V and less than 8 V (0 V<Vsig<8 V). In a period in which the common voltage Vcom becomes 16 V, the source line voltage Vsig may become more than 8 V and less than 16 V (8 V<Vsig<16 V). In either case, according to the transparent driving, an absolute value of the difference between the source line voltage Vsig and the common voltage Vcom becomes less than 8 V, and the parallelism of the light transmitted through the liquid crystal layer 30 increases. In other words, the second transparent voltage VA2 is not limited to 0 V, and an absolute value of the second transparent voltage VA2 may be less than 8 V.

Incidentally, in the transparent driving, the voltage to be applied to the liquid crystal layer 30 may be less than the lower limit value (for example, 8 V) of the gradation, and the source line voltage Vsig may not completely match the common voltage Vcom. As described above, the degree of scattering in a case where the degree of scattering of the light to be incident on the liquid crystal layer 30 is the highest when the scattering voltage VB is applied to the liquid crystal layer 30 is set to 100%. For example, the second transparent voltage VA2 is desirably a voltage at which the degree of scattering is less than 10%.

FIG. 11 is a diagram showing another example of the common voltage Vcom and the source line voltage Vsig in the transparent driving. Here, the waveform of the source line voltage Vsig is indicated by a solid line, and the waveform of the common voltage Vcom is indicated by a dashed double-dotted line.

As shown in FIG. 11, in this example, the polarity inversion of the common voltage Vcom and the source line voltage Vsig is stopped in the transparent driving. Furthermore, the common voltage Vcom and the source line voltage Vsig match each other at 8 V (reference voltage Vsig-c). Incidentally, the common voltage Vcom and the source line voltage Vsig may match each other at a voltage other than the reference voltage Vsig-c such as 0 V. In addition, similarly to the case shown in FIG. 10, the second transparent voltage VA2 is desirably a voltage at which the degree of scattering is less than 10%.

Although the transparent driving has been described by using the one-line-inversion drive scheme as an example, similar transparent driving can be applied to a line-inversion drive scheme of two or more lines and a frame-inversion drive scheme.

Next, a control example of the electronic device EA incorporating the transparent driving will be described with reference to FIGS. 12 to 18. Incidentally, a drive scheme in which one frame period has a plurality of sub-frame (field) periods is applied to the display device DSP. Such a drive scheme is called, for example, a field sequential system. In each sub-frame period, red, green, and blue images are selectively displayed. The images of the respective colors displayed in a time division manner in this manner are combined, and the combined image is visually recognized as an image of multi-color display by the user.

Figure 12:
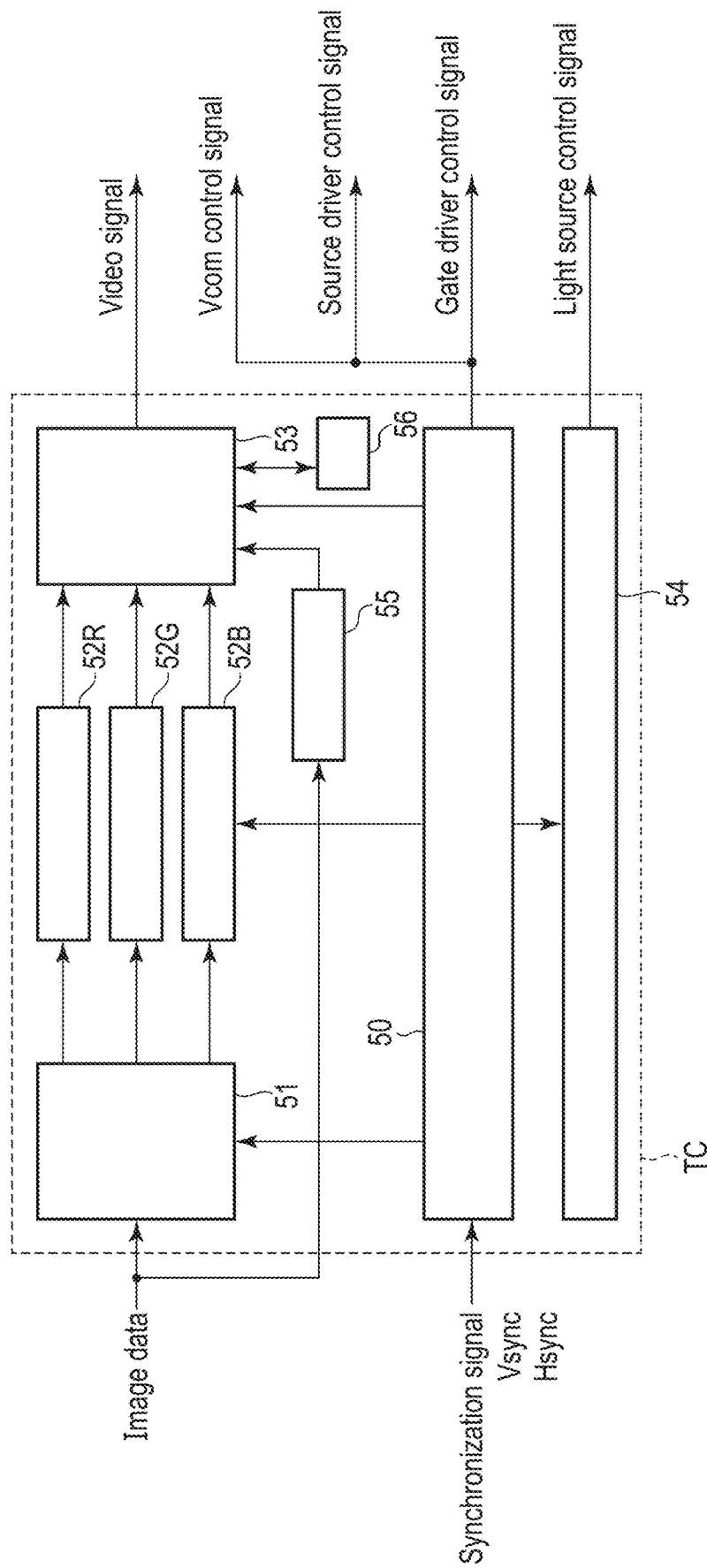
FIG. 12 is a diagram showing a configuration example of a timing controller shown in FIG. 4.

FIG. 12 is a diagram showing a configuration example of the timing controller TC shown in FIG. 4.

As shown in FIG. 12, the timing controller TC includes a timing generation unit 50, a frame memory 51, line memories 52R, 52G, and 52B, a data conversion unit 53, a light source control unit 54, a detector 55 that is an address detector, and the like.

The frame memory 51 stores image data for one frame input from the outside. The line memories 52R, 52G, and 52B store pieces of red, green, and blue sub-frame data, respectively. Each sub-frame data represents a red, green, or blue image (for example, a gradation value of each pixel PX) displayed on each pixel PX in a time division manner. The sub-frame data of each color stored in the line memory 52R, 52G, or 52B corresponds to a previous frame of the image data stored in the frame memory 51. The data conversion unit 53 generates a video signal by performing various kinds of data conversion processing such as gamma correction on the sub-frame data of each color stored in the line memory 52R, 52G, or 52B, and outputs the video signal to the source driver SD. Incidentally, the timing controller TC may be configured to distribute RGB data in the frame memory 51 and send the RGB data to the data conversion unit 53. In this case, the timing controller TC can be constituted without the line memories 52R, 52G, and 52B.

The light source control unit 54 outputs a light source control signal to the light source driver LSD. The light source driver LSD drives the light emitting elements LSR, LSG, and LSB based on the light source control signal. The light emitting elements LSR, LSG, and LSB can be driven by, for example, pulse width modulation (PWM) control. That is, the light source driver LSD can adjust the luminance of each of the light emitting elements LSR, LSG, and LSB according to a duty ratio of the signals output to the light emitting elements LSR, LSG, and LSB.

The timing generation unit 50 controls operation timings of the frame memory 51, the line memories 52R, 52G, and 52B, the data conversion unit 53, and the light source control unit 54 in synchronization with a vertical synchronization signal Vsync and a horizontal synchronization signal Hsync input from the outside. In addition, the timing generation unit 50 controls the source driver SD by outputting a source driver control signal, controls the gate driver GD by outputting a gate driver control signal, and outputs a Vcom control signal.

In a case where image data for one frame input from the outside includes data of an image, the detector 55 is configured to detect an address of the data of the image. Examples of the image include an image of the partner and a character displayed in a part of the display region DA. Examples of the character include a symbol including a letter, a figure, an icon, and the like. In addition, a case where data of the character is included in the image data means a case where data other than 0 is included in at least one place of all bits of digital data. Address information of the data of the image is applied to the data conversion unit 53. For this reason, in a case where the image data input from the outside includes the data of the image, the timing controller TC can generate the processed video signal and can output the processed video signal to the source driver SD in order to adjust the degree of scattering (transparency) of a region other than a region where the image is displayed. When the processed video signal can be generated, calculation by the data conversion unit 53 can be performed, or can be performed by using data stored in a table 56 of the timing controller TC.

Figure 13:
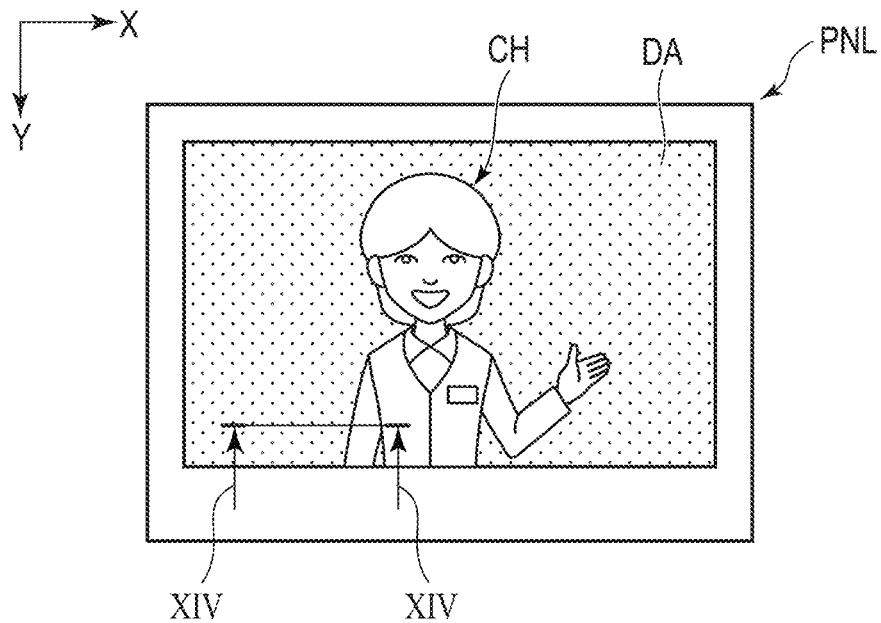
FIG. 13 is a plan view showing the display panel, is a diagram for describing a usage example of the electronic device, and is a diagram showing a state where a scattering voltage and a first transparent voltage are applied to the liquid crystal layer and an image is displayed in a display region of the display panel.

Here, an example in which an image in the display region DA of the display panel PNL is displayed will be described. FIG. 13 is a plan view showing the display panel PNL, is a diagram for describing a usage example of the electronic device EA, and is a diagram showing a state where the scattering voltage VB and the first transparent voltage VA1 are applied to the liquid crystal layer 30 and an image is displayed in the display region DA of the display panel PNL.

As shown in FIG. 13, each of the user and the partner has a conference by using the electronic device EA, and the user is viewing the partner displayed in the display region DA. Both the user and the partner are holding the conference while viewing the screen. For this reason, the user can match a line of sight with the partner displayed on the screen, and can confirm a gesture of the partner.

The scattering voltage VB equal to or higher than a predetermined voltage of a gradation voltage is applied to each pixel in a region overlapping an image CH of the partner. In addition, in this example, the first transparent voltage VA1 is applied to each pixel in a region not overlapping the image of the partner. Incidentally, the first transparent voltage VA1 may be a voltage in a predetermined range in the vicinity where the gradation reproduction of the gradation voltage can be performed.

In the region overlapping the image CH of the partner, since the display region DA (liquid crystal layer 30) of the display panel PNL scatters not only the illumination light of the light source unit LU but also the external light beam, the user hardly visually recognizes the camera CA through the display region DA.

Figure 14:
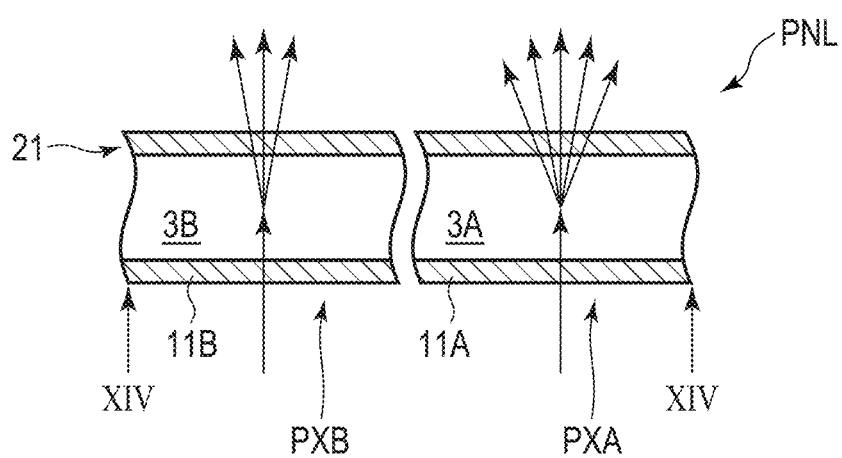
FIG. 14 is a cross-sectional view showing the display panel in FIG. 13 along line XIV-XIV.

FIG. 14 is a cross-sectional view showing the display panel PNL of FIG. 13 along line XIV-XIV. FIG. 14 illustrates only a part of the display panel PNL necessary for description. In addition, FIG. 14 illustrates an optical path, and also illustrates a scene where light is diffused by the liquid crystal layer 30 and a scene where the parallelism of light is maintained by the liquid crystal layer 30.

As shown in FIG. 14, the plurality of pixels PX of the display panel PNL include a first pixel PXA and a second pixel PXB. The first pixel PXA includes a first pixel electrode 11A, and the second pixel PXB includes a second pixel electrode 11B.

The liquid crystal layer 30 (display function layer) has a plurality of liquid crystal regions 3 (display function regions). The liquid crystal layer 30 includes a first liquid crystal region 3A (first display function region) to which a voltage to be applied between the first pixel electrode 11A and the common electrode 21 is applied, and a second liquid crystal region 3B (second display function region) to which a voltage to be applied between the second pixel electrode 11B and the common electrode 21 is applied. In the present embodiment, the first liquid crystal region 3A is sandwiched between the first pixel electrode 11A and the common electrode 21, and the second liquid crystal region 3B is sandwiched between the second pixel electrode 11B and the common electrode 21.

A voltage is applied between one corresponding pixel electrode 11 of the plurality of pixel electrodes 11 and the common electrode 21, and thus, the scattering voltage VB and the transparent voltage (first transparent voltage VA1) are selectively applied to each liquid crystal region 3 (display function region).

The liquid crystal layer 30 (liquid crystal region 3) scatters the light to be incident in a case where the scattering voltage VB is applied, and maintains the parallelism of the light to be incident in a case where the first transparent voltage VA1 is applied. The parallelism of the external light beam transmitted through each liquid crystal region 3 when the transparent voltage (first transparent voltage VA1) is applied is higher than the parallelism of the external light beam transmitted through each liquid crystal region 3 when the scattering voltage VB is applied. In addition, a degree of scattering of the external light beam transmitted through the liquid crystal region 3 when the scattering voltage VB is applied is higher than the degree of scattering of the external light beam transmitted through the liquid crystal region 3 when the transparent voltage (first transparent voltage VA1) is applied.

As shown in FIGS. 13 and 14, in a period in which the image is displayed, the first pixel PXA is located in the region overlapping the image CH of the partner, and the scattering voltage VB is applied to the first liquid crystal region 3A. In contrast, the second pixel PXB is located in the region not overlapping the image CH of the partner, and the first transparent voltage VA1 is applied to the second liquid crystal region 3B. In the present embodiment, since the liquid crystal layer 30 uses a reverse mode polymer dispersed liquid crystal, the scattering voltage VB is higher than the first transparent voltage VA1. However, unlike the present embodiment, in a case where the liquid crystal layer 30 uses a normal mode polymer dispersed liquid crystal, the first transparent voltage VA1 is higher than the scattering voltage VB.

Focusing on one frame period of the period in which the image is displayed in the display region DA, the control unit CON applies a voltage between each of the plurality of pixel electrodes 11 and the common electrode 21 in a write period, selectively applies the scattering voltage VB and the transparent voltage (first transparent voltage VA1) to the plurality of liquid crystal regions 3, and prohibits the irradiation of the light by the light source unit LU.

The control unit CON holds a state where the scattering voltage VB and the transparent voltage (first transparent voltage VA1) are selectively applied to the plurality of liquid crystal regions 3 in a light emission period independent of the write period and subsequent to the write period, permits irradiation of light by the light source unit LU, irradiates the liquid crystal layer 30 with light, and scatters the light irradiated by the light source unit LU in the plurality of liquid crystal regions 3 to which the scattering voltage VB is applied among the plurality of liquid crystal regions 3. As a result, the control unit CON can display the image in the display region DA. Incidentally, the control unit CON prohibits capturing by the camera CA in the light emission period.

The color of the image (for example, the color of the first pixel PXA) displayed in the display region DA is based on the color emitted by the light source unit LU. For this reason, the control unit CON can set the color of the image to a single color emitted by the light source unit LU or a color mixture of a plurality of colors emitted by the light source unit LU. In addition, it is also possible to display all the images in a single color or display the images in different colors for each part.

A degree of scattering of light of the first liquid crystal region 3A is higher than a degree of scattering of light of the second liquid crystal region 3B. The first liquid crystal region 3A is in the scattered state. For this reason, in a case where the background is viewed through the display panel PNL, the visibility of the background can most degrade in the region overlapping the image CH of the partner.

In contrast, the parallelism of light passing through the second liquid crystal region 3B is higher than the parallelism of light passing through the first liquid crystal region 3A. The second liquid crystal region 3B is in a first transparent state. Light is slightly scattered in the second liquid crystal region 3B.

In a case where the background is viewed through the display panel PNL, since the background can be blurred in the region not overlapping the image of the partner and the visibility of the background in the region not overlapping the image of the partner can degrade, the user can easily view the image of the partner.

Incidentally, the first transparent voltage VA1 in the region not overlapping the image of the partner may be matched with the second transparent voltage VA2, and the background may be brought into the transparent state without being blurred in the region not overlapping the image of the partner. Furthermore, the scattering voltage VB may be applied to the second liquid crystal region 3B, and the second liquid crystal region 3B may be brought into the scattered state.

Next, an example in which the subject is more clearly captured through the display panel PNL by the camera CA by incorporating the transparent driving (driving in the reset period) for setting the voltage between the pixel electrode 11 and the common electrode 21 to be smaller than, for example, the lower limit value of the gradation into the sequence of the image display will be described. Incidentally, the visibility of the background of the display panel PNL can be improved by providing the reset period. FIG. 15 is a plan view showing the display panel PNL, is a diagram for describing a usage example of the electronic device EA, and is a diagram in which the second transparent voltage VA2 is applied to the liquid crystal layer 30, the display region DA (liquid crystal layer 30) of the display panel PNL is set to the second transparent state, and the camera CA is viewed through the display panel PNL.

As shown in FIG. 15, the second transparent voltage VA2 is applied to each pixel of the display region DA in the reset period independent of the write period and the light emission period. Since the write period, the light emission period, and the reset period are switched at a high speed, the line of sight of the user is directed to the display region DA of the display panel PNL even in the reset period. For this reason, the user can naturally direct their own line of sight toward the camera. In the reset period, the parallelism of the external light beam can be increased in the display region DA (liquid crystal layer 30) of the display panel PNL.

FIG. 16 is a cross-sectional view showing the display panel PNL of FIG. 15 along line XVI-XVI. FIG. 16 illustrates only a part of the display panel PNL necessary for description. In addition, FIG. 16 illustrates an optical path, and illustrates a scene where the parallelism of light is maintained in the liquid crystal layer 30.

As shown in FIG. 16, the first pixel PXA and the second pixel PXB are identical to the first pixel PXA and the second pixel PXB in FIG. 14, respectively. A voltage is applied between one corresponding pixel electrode 11 of the plurality of pixel electrodes 11 and the common electrode 21, and thus, the transparent voltage (second transparent voltage VA2) is applied to each liquid crystal region 3 (display function region).

The liquid crystal layer 30 (liquid crystal region 3) maintains the parallelism of light to be incident in a case where the second transparent voltage VA2 is applied. The parallelism of the external light beam transmitted through each liquid crystal region 3 when the second transparent voltage VA2 is applied is higher than the parallelism of the external light beam transmitted through each liquid crystal region 3 when the first transparent voltage VA1 is applied. In addition, the degree of scattering of the external light beam transmitted through each liquid crystal region 3 when the second transparent voltage VA2 is applied is lower than the degree of scattering of the external light beam transmitted through each liquid crystal region 3 when the first transparent voltage VA1 is applied.

However, unlike the present embodiment, the first transparent voltage VA1 and the second transparent voltage VA2 may match. In this case, the parallelism of the external light beam transmitted through each liquid crystal region 3 when the second transparent voltage VA2 is applied is identical to the parallelism of the external light beam transmitted through each liquid crystal region 3 when the first transparent voltage VA1 is applied.

As shown in FIGS. 15 and 16, in the reset period, the second transparent voltage VA2 is applied to the plurality of liquid crystal regions 3 including the first liquid crystal region 3A of the first pixel PXA and the second liquid crystal region 3B of the second pixel PXB. In the present embodiment, since the liquid crystal layer 30 uses a reverse mode polymer dispersed liquid crystal, the second transparent voltage VA2 is lower than the first transparent voltage VA1. However, unlike the present embodiment, in a case where the liquid crystal layer 30 uses the normal mode polymer dispersed liquid crystal, the second transparent voltage VA2 is higher than the first transparent voltage VA1.

Focusing on one frame period of the period in which the image is displayed in the display region DA, the control unit CON applies a voltage between each of the plurality of pixel electrodes 11 and the common electrode 21, applies the transparent voltage (second transparent voltage VA2) to the plurality of liquid crystal regions 3, sets the display region DA to be transparent, and prohibits the emission of the light by the light source unit LU in the reset period. The plurality of liquid crystal regions 3 including the first liquid crystal region 3A and the second liquid crystal region 3B are in the second transparent state.

As described above, the control unit CON prohibits irradiation of light by the light source unit LU in a period other than the light emission period (the write period and the reset period). For this reason, the control unit CON sets a period independent of the light emission period as the capturing period. In the capturing period, the control unit CON prohibits the irradiation of light by the light source unit LU, applies the transparent voltage (the first transparent voltage VA1 or the second transparent voltage VA2) to the plurality of liquid crystal regions 3, sets the display region DA to be transparent, transmits the external light beam through the plurality of liquid crystal regions 3, permits capturing by the camera CA, and causes the camera CA to take in the external light beam transmitted through the display region DA.

As a result, it is possible to avoid a situation in which the illumination light of the light source unit LU is taken into the camera CA. The capturing period is set within the reset period, and thus, the camera CA can more clearly capture the subject through the display panel PNL.

Figure 17:
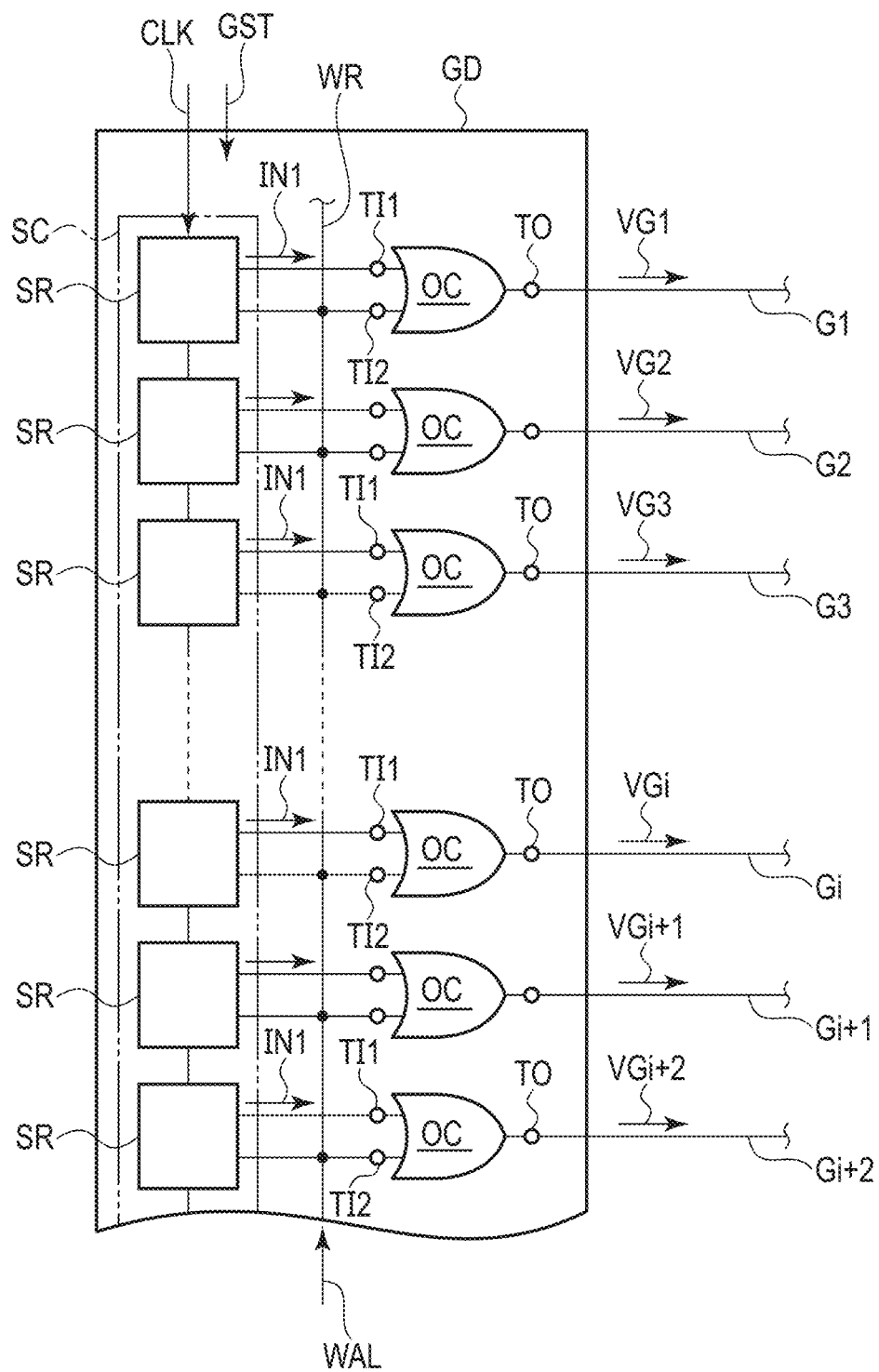

Next, the gate driver GD of the present embodiment will be described. FIG. 17 is a circuit diagram showing a part of the gate driver GD and some gate lines G shown in FIG. 4 and the like.

As shown in FIG. 17, the gate driver GD includes a sequential circuit SC, a control wiring line WR, and a plurality of OR circuits OC. The sequential circuit SC includes a plurality of shift registers SR. The plurality of shift registers SR are connected in series.

The OR circuits OC are connected to the shift registers SR in a one-to-one relationship. The OR circuit OC includes a first input terminal TI1, a second input terminal TI2, and an output terminal TO. The first input terminal TI1 is connected to the corresponding shift register SR. The second input terminal TI2 is connected to the control wiring line WR. The output terminal TO is connected to corresponding one gate line G.

In a case where a high-level first input signal IN1 is applied from the shift register SR to the first input terminal TI1, the OR circuit OC outputs a first-level gate signal VG from the output terminal TO to the gate line G. In a case where a high-level second input signal WAL is applied from the control wiring line WR to the second input terminal TI2, the OR circuit OC outputs the first-level gate signal VG from the output terminal TO to the gate line G. In a case where a low-level first input signal IN1 and a low-level second input signal WAL are simultaneously applied, the OR circuit OC outputs a second-level gate signal VG from the output terminal TO to the gate line G. For example, the first level is a high level, and the second level is a low level.

The control unit CON (for example, the timing controller TC) applies the high-level second input signal WAL to the control wiring line WR, the gate driver GD simultaneously outputs the first-level gate signal VG to all the gate lines G. As a result, all the switching elements SW can be turned on at once.

Alternatively, the control unit CON (for example, the timing controller TC) applies the low-level second input signal WAL to the control wiring line WR. The sequential circuit SC sequentially applies the high-level first input signal IN1 to the first input terminals TI1 of all the OR circuits OC. The gate driver GD sequentially outputs the first-level gate signal VG to all the gate lines G, and turns on the switching element SW.

However, unlike the present embodiment, the gate driver GD may not be configured to simultaneously output the first-level gate signal VG to all the gate lines G. For example, the gate driver GD may be configured to repeatedly perform an operation of simultaneously outputting the first-level gate signal VG to the plurality of gate lines G of the plurality of rows while changing a target from which the gate signal VG of the first level is output.

Figure 18:
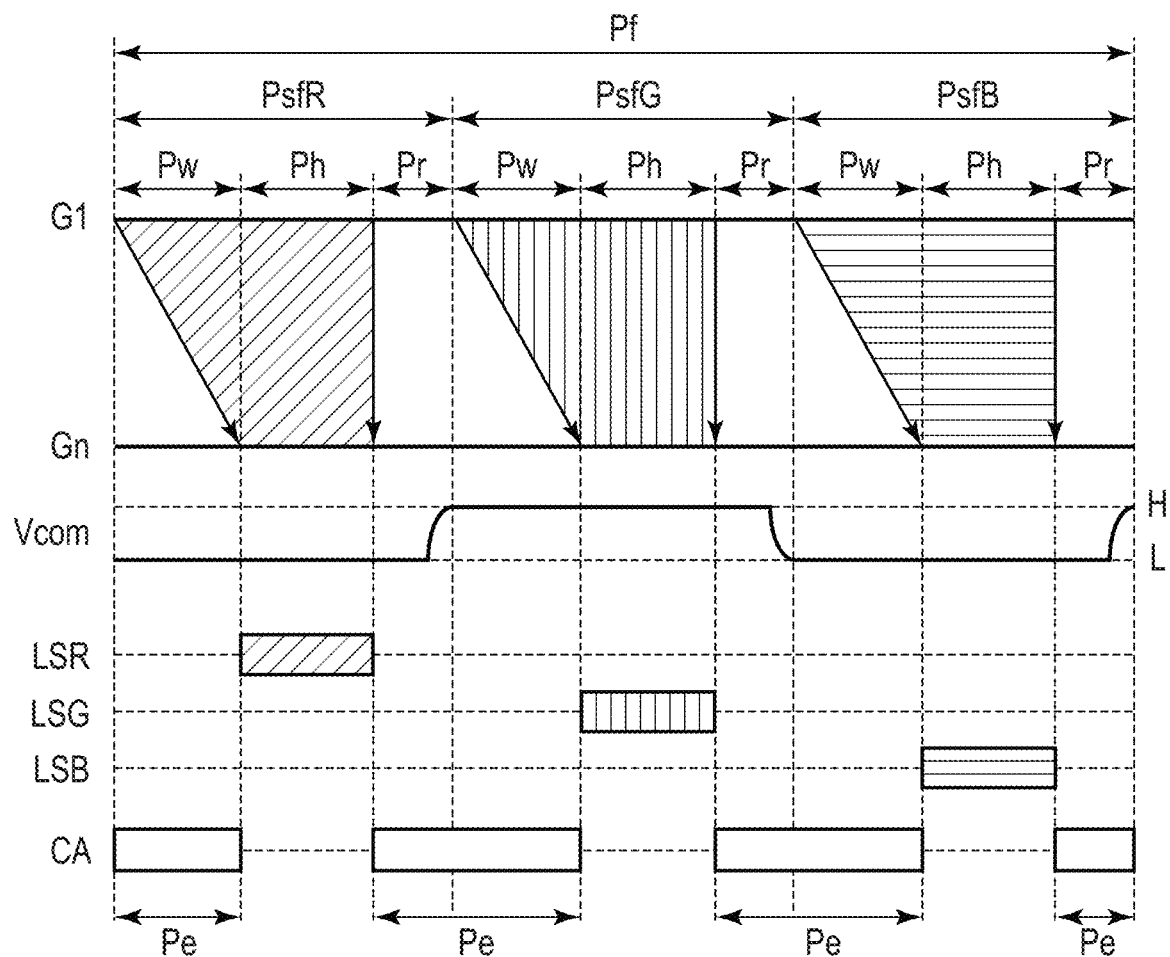
FIG. 18 is a timing chart for describing an example of an operation of the electronic device according to the first embodiment.

FIG. 18 is a timing chart for describing an example of an operation of the electronic device EA according to the first embodiment. As shown in FIG. 18, one frame period Pf corresponds to, for example, a period from when the vertical synchronization signal Vsync falls to when the vertical synchronization signal falls again. For example, in a case where the display device DSP is driven at 60 Hz, one frame period Pf is about 16.7 ms.

One frame period Pf includes a first sub-frame period PsfR, a second sub-frame period PsfG, and a third sub-frame period PsfB which are independent of each other. In this example, the first sub-frame period PsfR, the second sub-frame period PsfG, and the third sub-frame period PsfB are continued in this order. However, unlike the present embodiment, the order of these sub-frame periods Psf may be reversed. The first sub-frame period PsfR, the second sub-frame period PsfG, and the third sub-frame period PsfB each include a write period Pw and a light emission period Ph subsequent to the write period Pw.

At least one sub-frame period Psf of the first sub-frame period PsfR, the second sub-frame period PsfG, and the third sub-frame period PsfB further includes a reset period Pr. In the present embodiment, the first sub-frame period PsfR, the second sub-frame period PsfG, and the third sub-frame period PsfB each include the reset period Pr. The reset period Pr is independent of the write period Pw and the light emission period Ph, and is subsequent to the light emission period Ph. However, unlike the present embodiment, the reset period Pr may precede the write period Pw.

In each sub-frame period Psf, the timing generation unit 50 executes display drive of each color by controlling the frame memory 51, the line memories 52R, 52G, and 52B, and the data conversion unit 53 by a data synchronization signal SS or using the detector 55 and the table 56.

In the write period Pw of the first sub-frame period PsfR, the gate driver GD sequentially applies the high-level gate signal VG to each of the gate lines G1 to Gn. Furthermore, while the gate signal is applied, the source driver SD applies the source line voltage Vsig corresponding to red sub-frame data (R_DATA) stored in line memory 52R to each of the source lines S1 to Sm. More specifically, an operation of simultaneously applying the source line voltages Vsig of the gradation corresponding to each pixel PX of the line to which the gate signal is supplied to each of the source lines S1 to Sm is repeated. The electric potential of the pixel electrode 11 is retained by applying the source line voltage Vsig to the pixel electrode 11 of the pixel PX corresponding to the selected gate line G through the switching element SW and then switching the switching element SW to a non-conductive state. Thereafter, the gate line G of a next row is selected, and similar driving is sequentially performed. Incidentally, in this example, the polarity of the common voltage Vcom for driving the common electrode 21 is inverted for each sub-frame period Psf. More specifically, the polarity of the common voltage Vcom is inverted after a timing at which the writing of the second transparent voltage VA2 to all the pixels PX is ended in the reset period Pr.

By such an operation, a voltage corresponding to the red sub-frame data is written between the pixel electrode 11 and the common electrode 21 of each pixel PX. In each sub-frame period Psf, the source line voltage Vsig supplied to each pixel electrode 11 through each of the source lines S1 to Sm has polarity different from the common voltage Vcom supplied to the common electrode 21, or is the reference voltage Vsig-c. Accordingly, an absolute value of the voltages to be written to the pixels PX in the display region DA is 8 V or more and 16 V or less. From the above, the control unit CON selectively applies the scattering voltage VB and the first transparent voltage VA1 to the plurality of liquid crystal regions 3 in the write period Pw.

The light emission period Ph of the first sub-frame period PsfR is a period from the completion of writing to all the pixels PX to the arrival of the reset period Pr. In the light emission period Ph, the control unit CON holds a state where the scattering voltage VB and the first transparent voltage VA1 are selectively applied to the plurality of liquid crystal regions 3, permits the irradiation of the light of the first color by the light emitting element LSR, prohibits the irradiation of the light of the second color by the light emitting element LSG, and prohibits the irradiation of the light of the third color by the light emitting element LSB.

As a result, the control unit CON can scatter the light of the first color irradiated by the light emitting element LSR in the plurality of liquid crystal regions 3 to which the scattering voltage VB is applied in the write period Pw of the first sub-frame period PsfR. A red image is displayed in the display region DA.

Incidentally, when the light emitting element LSR is turned on, the light emitting element is turned on without a margin period after the writing to all the pixels PX is completed. However, unlike the present embodiment, the light emitting element LSR may be turned on with the margin period after the writing to all the pixels PX is completed. As a result, for example, a response period of a liquid crystal can be secured.

In the reset period Pr of the first sub-frame period PsfR, the transparent driving is executed under the control of the timing controller TC. That is, the gate driver GD simultaneously applies the high-level gate signal VG to each of the gate lines G1 to Gn. For example, the present invention can be implemented by applying the high-level second input signal WAL to the control wiring line WR. Furthermore, while the gate signal VG is applied, the source driver SD applies the source line voltage Vsig having, for example, the same value as the common voltage Vcom to each of the source lines S1 to Sm. By such an operation, the second transparent voltage VA2 is applied to the plurality of liquid crystal regions 3.

After the gate signal VG is applied to the corresponding gate line G, the pixel electrode 11 of each pixel PX is electrically in a floating state until the gate signal VG is applied to the gate line G next time. Accordingly, in the pixel PX (liquid crystal region 3) in which the second transparent voltage VA2 is written, the second transparent voltage VA2 is held until a next gate signal VG is supplied to the corresponding gate line G.

In the pixel PX in which the second transparent voltage VA2 is written, the liquid crystal region 3 is in a good second transparent state. In the reset period Pr, all of the light emitting elements LSR, LSG, and LSB are turned off. Incidentally, the light emitting elements LSR, LSG, and LSB are desirably turned off in the reset period Pr, but may be turned on in the reset period Pr.

The source line voltage Vsig supplied to each of the source lines S1 to Sm in the reset period Pr does not need to be the same as the common voltage Vcom as long as the voltage written to each pixel PX is a value that becomes the second transparent voltage VA2. Various aspects described with reference to FIGS. 10 and 11 can be applied to the common voltage Vcom and the source line voltage Vsig in the transparent driving.

A period in which the high-level gate signal VG is collectively applied to all the gate lines G1 to Gn is secured for a certain period in the reset period Pr, and thus, the electric potential of the pixel electrode 11 and the electric potential of the common electrode 21 can be caused to transition to desired values. In addition, in the example illustrated, the reset period Pr includes a holding period for holding the second transparent voltage VA2 after the second transparent voltage VA2 is applied to all the liquid crystal regions 3. However, unlike the present embodiment, the reset period Pr may be a period in which the second transparent voltage VA2 is applied to all the liquid crystal regions 3, and the reset period Pr may not include the above holding period.

Operations in the second sub-frame period PsfG and the third sub-frame period PsfB are similar to the operation in the first sub-frame period PsfR. That is, the second sub-frame period PsfG includes the write period Pw, the light emission period Ph, and the reset period Pr, and in the write period Pw, a voltage corresponding to green sub-frame data (G_DATA) stored in the line memory 52G is written to the pixel PX in the display region DA.

In the light emission period Ph of the second sub-frame period PsfG, the control unit CON holds a state where the scattering voltage VB and the first transparent voltage VA1 are selectively applied to the plurality of liquid crystal regions 3, permits the irradiation of the light of the second color by the light emitting element LSG, prohibits the irradiation of the light of the first color by the light emitting element LSR, and prohibits the irradiation of the light of the third color by the light emitting element LSB.

As a result, the control unit CON can scatter the light of the second color irradiated by the light emitting element LSG in the plurality of liquid crystal regions 3 to which the scattering voltage VB is applied in the write period Pw of the second sub-frame period PsfG. A green image is displayed in the display region DA.

In addition, the third sub-frame period PsfB includes the write period Pw, the light emission period Ph, and the reset period Pr, and in the write period Pw, a voltage corresponding to blue sub-frame data (B_DATA) stored in the line memory 52B is written to the pixel PX in the display region DA.

In the light emission period Ph of the third sub-frame period PsfB, the control unit CON holds a state where the scattering voltage VB and the first transparent voltage VA1 are selectively applied to the plurality of liquid crystal regions 3, permits the irradiation of the light of the third color by the light emitting element LSB, prohibits the irradiation of the light of the first color by the light emitting element LSR, and prohibits the irradiation of the light of the second color by the light emitting element LSG.

As a result, the control unit CON can scatter the light of the third color irradiated by the light emitting element LSB in the plurality of liquid crystal regions 3 to which the scattering voltage VB is applied in the write period Pw of the third sub-frame period PsfB. A blue image is displayed in the display region DA.

In a certain frame period Pf, image data to be displayed in a next frame period Pf is written to the frame memory 51. Furthermore, the sub-frame data of the line memory 52R, 52G, or 52B in which the writing to the pixel PX is completed is rewritten to the sub-frame data corresponding to the image data written in the frame memory 51.

The red, green, and blue images displayed in the time division manner in the first sub-frame period PsfR, the second sub-frame period PsfG, and the third sub-frame period PsfB are mixed, and thus, the image is visually recognized as an image of multi-color display by the user.

The control unit CON sets a capturing period Pe within the write period Pw and the reset period Pr. In the present embodiment, the control unit CON sets the capturing period Pe within the plurality of write periods Pw and the plurality of reset periods Pr in one frame period Pf. More specifically, the control unit CON sets the capturing period Pe to all the write periods Pw and all the reset periods Pr in one frame period Pf.

Since the subject can be captured by the camera CA in both periods of the write period Pw and the reset period Pr, a situation in which the amount of exposed light degrades can be avoided. In addition, since the capturing period Pe can be set to the reset period Pr, the subject can be captured by the camera CA in a state where the transparency of the display region DA is the highest. For example, the camera CA can more clearly capture the subject through the display panel PNL.

In addition, in the reset period Pr, the second transparent voltage VA2 is applied to each liquid crystal region 3. Such a reset period Pr is provided once every one sub-frame period Psf, and thus, it is possible to increase a period in which the transparency of the display region DA increases. Incidentally, the reset period Pr may be provided once every one frame period Pf, or may be provided once for a plurality of frame periods. From a point of view of suppressing display failures such as burning of an image, a frequency of resetting is preferably high.

When the reset period Pr is adjusted, not only the period until the electric potential of the pixel electrode 11 and the electric potential of the common electrode 21 transition to the desired values as described above, but also the transparency of the display region DA may be considered.

As a ratio of the reset period Pr occupying in one frame period Pf increases, the period in which the transparency of the display region DA increases can be increased, but the visibility of the image may degrade. In consideration of the transparency and the visibility, it is preferable to determine a length of the reset period Pr.

The first sub-frame period PsfR, the second sub-frame period PsfG, and the third sub-frame period PsfB can have, for example, the same length. Color chromaticity of a display image may be adjusted by varying a ratio of the first sub-frame period PsfR, the second sub-frame period PsfG, and the third sub-frame period PsfB.

Here, the scattering voltage VB and the first transparent voltage VA1 in consideration of the polarity inversion drive scheme will be described.

As shown in FIGS. 7, 8A, 8B, and 8C, the scattering voltage VB has a positive-polarity scattering voltage and a negative-polarity scattering voltage. The positive-polarity scattering voltage is, for example, 8 V to 16 V, and the negative-polarity scattering voltage is, for example, −16 V to −8 V.

the positive-polarity first transparent voltage VA1 and absolute value of the negative-polarity first transparent voltage VA1 are each half of a maximum value of the positive-polarity scattering voltage VB and half of a maximum value of the absolute value of the negative-polarity scattering voltage VB. For example, in the example illustrated in FIG. 9, the positive-polarity first transparent voltage VA1 and the absolute value of the negative-polarity first transparent voltage VA1 are each 8 V, and the maximum value of the positive-polarity scattering voltage VB and the maximum value of the absolute value of the negative-polarity scattering voltage VB are each 16 V. For example, regardless of the polarity of the first transparent voltage VA1 and the scattering voltage VB, the absolute value of the first transparent voltage VA1 is half the maximum value of the absolute value of the scattering voltage VB. However, the present invention is not limited to the above example, and the positive-polarity and negative-polarity first transparent voltages VA1 may be voltages at which the degree of scattering is in a range of 50% or less.

According to the electronic device EA having the above-described configuration according to the first embodiment, the electronic device EA includes the display panel PNL having the display region DA that displays the image and transmits the external light beam, the light source unit LU located outside the region opposed to the display region DA of the display panel PNL, the camera CA opposed to the display region DA of the display panel PNL, and the control unit CON that controls the driving of the display panel PNL, the light source unit LU, and the camera CA.

In the light emission period Ph, the control unit CON permits the irradiation of the light by the light source unit LU, irradiates the display region DA with light, displays the image in the display region DA, and prohibits the capturing by the camera CA. In the capturing period Pe independent of the light emission period Ph, the control unit CON prohibits the irradiation of the light by the light source unit LU, sets the display region DA to be transparent, permits the capturing by the camera CA, and causes the camera CA to take in the external light beam transmitted through the display region DA.

As a result, it is possible to obtain the electronic device EA capable of capturing the subject through the screen and displaying the image on the screen. For example, the user can naturally direct their own line of sight toward the camera while matching their line of sight with the partner displayed on the screen.

The gate driver GD can output the high-level (on-level) gate signal VG to all the gate lines G in the reset period Pr. For this reason, as described above, a time period of the reset period Pr can be shortened as compared with a case where the gate lines G are sequentially scanned in units of a plurality of lines in the reset period Pr or the gate lines G are sequentially scanned in units of one line in the reset period Pr.

In addition, according to the configuration of the present embodiment, the display device DSP can be driven by the source driver SD having a low withstand voltage. This effect will be described with reference to FIGS. 7 and 9.

A comparative example in which the common voltage Vcom is a DC voltage and only the source line voltage Vsig is inverted in polarity with respect to the common voltage Vcom is assumed. In this case, the source line voltage Vsig is set to the same voltage as the common voltage Vcom, and thus, a voltage of 0 V (second transparent voltage VA2) can be applied to each liquid crystal region 3 even in normal display drive. However, in this comparative example, in order to use the scattering voltage of FIG. 7 for the gradation reproduction, the source line voltage Vsig needs to be variable in a range of −16 V to +16 V with respect to the common voltage Vcom. That is, the circuit such as the source driver SD needs to have a withstand voltage of 32 V.

On the other hand, according to the configuration of the present embodiment, the source line voltage Vsig and the common voltage Vcom may be variable in a range of, for example, 16 V as shown in FIG. 9. That is, it is sufficient that the circuit such as the source driver SD has a withstand voltage of 16 V. In this manner, the withstand voltage of the circuit is suppressed to be low, and thus, it is possible to reduce a circuit size and manufacturing cost.

In addition to the above effect, various suitable effects can be obtained from the present embodiment.

Modified Example of First Embodiment

Figure 19:
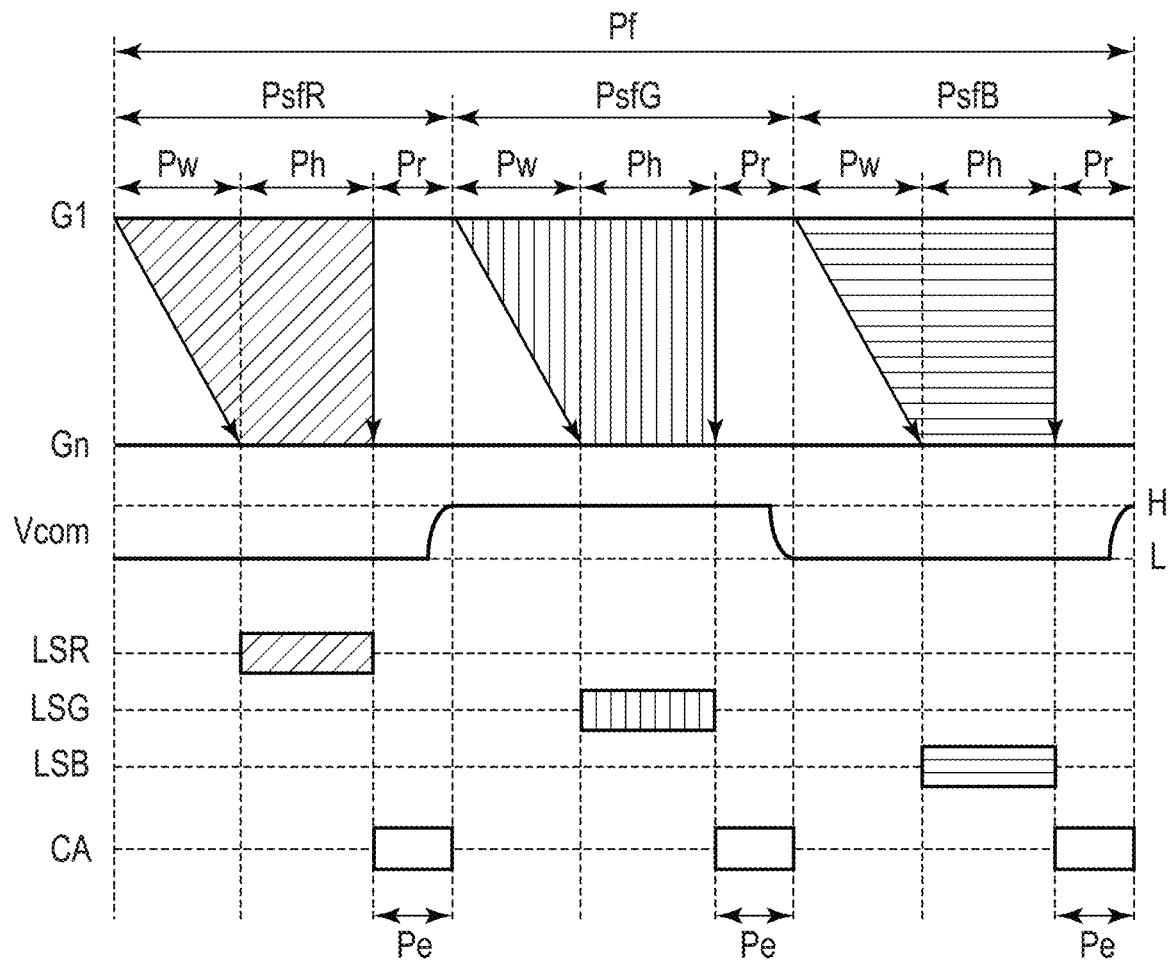
FIG. 19 is a timing chart for describing another example of the operation of the electronic device according to the first embodiment.

Next, a modified example of the first embodiment will be described. An electronic device EA of the present modified example has a configuration similar to the configuration of the electronic device EA of the first embodiment. FIG. 19 is a timing chart for describing another example of the operation of the electronic device EA according to the first embodiment.

As shown in FIG. 19, the control unit CON may set the capturing period Pe only to the reset period Pr. In the present modified example, the control unit CON sets the capturing period Pe to all the reset periods Pr in one frame period Pf.

In the present modified example, effects similar to the effects of the first embodiment can also be obtained. The camera CA does not take in the external light beam transmitted through the liquid crystal region 3 to which the scattering voltage VB is applied and the external light beam transmitted through the liquid crystal region 3 to which the first transparent voltage VA1 is applied. For this reason, as compared with the first embodiment, the subject can be more clearly captured through the display panel PNL by the camera CA.

Incidentally, in the present modified example, the frequencies of the reset period Pr and the capturing period Pe can also be variously modified. For example, the control unit CON may set the capturing period Pe to only one reset period Pr in one frame period Pf, or may set the capturing period Pe to only two reset periods Pr in one frame period Pf.

Second Embodiment

Next, a second embodiment will be described. An electronic device EA of the second embodiment has a configuration similar to the configuration of the electronic device EA of the first embodiment. FIG. 20 is a plan view showing the display panel PNL of the electronic device EA according to the second embodiment, is a diagram for describing a usage example of the electronic device EA, and is a diagram in which the first transparent voltage VA1 is applied to the liquid crystal layer 30, the display region DA (liquid crystal layer 30) of the display panel PNL is set to the first transparent state, and the camera CA is viewed through the display panel PNL.

Figure 22:
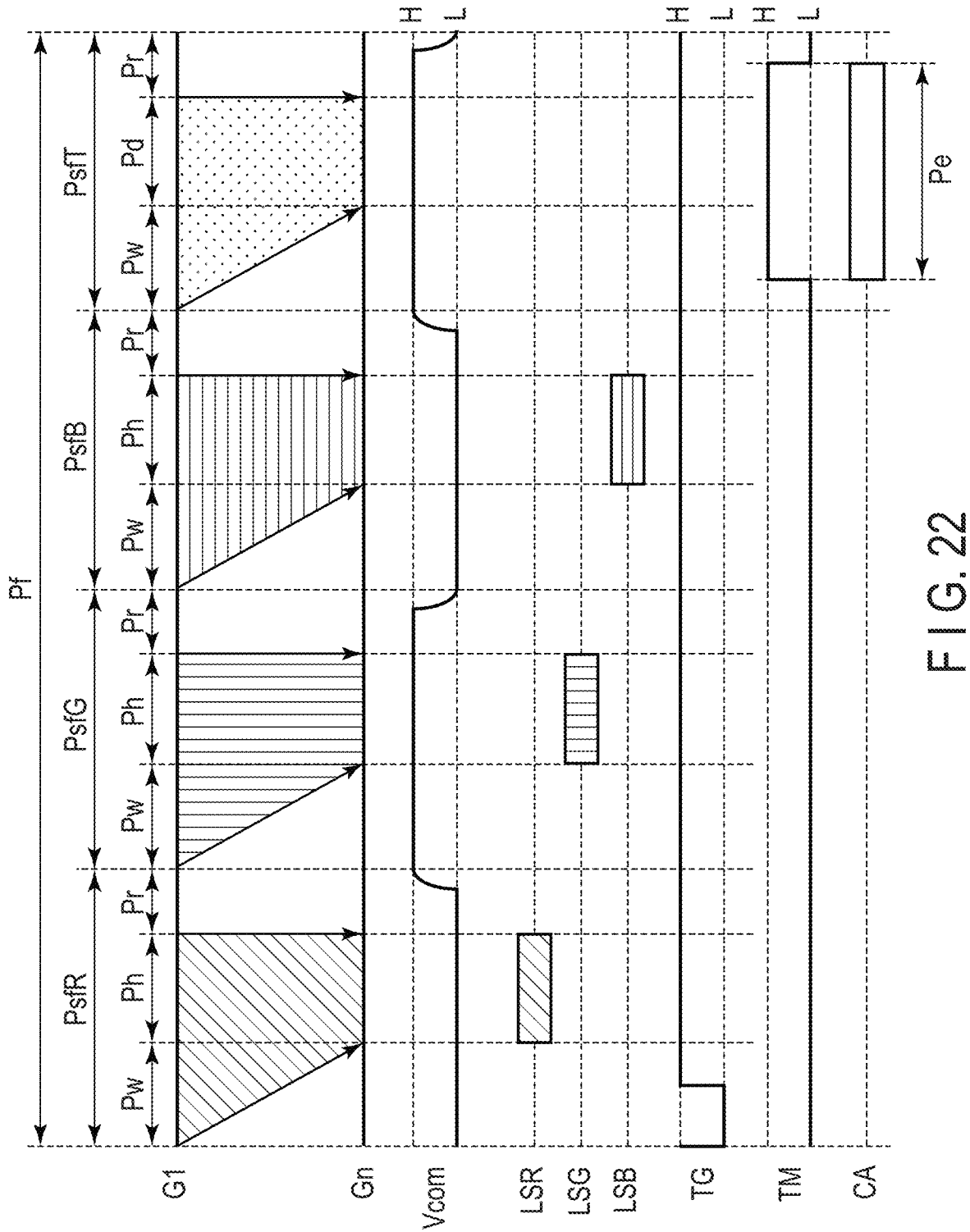
FIG. 22 is a timing chart for describing an example of an operation of the electronic device according to the second embodiment.

As shown in FIG. 20, the control unit CON may add the sub-frame period PsfT shown in FIG. 22 to one frame period Pf. In the sub-frame period PsfT, the control unit CON applies the first transparent voltage VA1 to all the liquid crystal regions 3, and brings the display region DA (liquid crystal layer 30) into the first transparent state. As a result, the control unit CON can set the capturing period Pe to the sub-frame period PsfT.

FIG. 21 is a cross-sectional view showing the display panel PNL of FIG. 20 along line XXI-XXI. FIG. 21 illustrates only a part of the display panel PNL necessary for description. In addition, FIG. 21 illustrates an optical path, and illustrates a scene where the parallelism of light is maintained in the liquid crystal layer 30.

As shown in FIG. 21, the first pixel PXA and the second pixel PXB are identical to the first pixel PXA and the second pixel PXB in FIG. 14, respectively. A voltage is applied between one corresponding pixel electrode 11 of the plurality of pixel electrodes 11 and the common electrode 21, and thus, the transparent voltage (first transparent voltage VA1) is applied to each liquid crystal region 3 (display function region). As described above, the liquid crystal layer 30 (liquid crystal region 3) maintains the parallelism of the incident light in a case where the first transparent voltage VA1 is applied.

In the sub-frame period PsfT, the control unit CON prohibits the irradiation of the light by the light source unit LU. For this reason, the control unit CON can set the sub-frame period PsfT as the capturing period Pe. In the capturing period Pe, the control unit CON prohibits the irradiation of the light by the light source unit LU, applies the transparent voltage (first transparent voltage VA1) to the plurality of liquid crystal regions 3, sets the display region DA to be transparent, transmits the external light beam through the plurality of liquid crystal regions 3, permits the capturing by the camera CA, and causes the camera CA to take in the external light beam transmitted through the display region DA.

As a result, it is possible to avoid a situation in which the illumination light of the light source unit LU is taken into the camera CA. The capturing period is set to the sub-frame period PsfT in which the scattering voltage VB is not applied, and thus, the camera CA can more clearly capture the subject through the display panel PNL.

FIG. 22 is a timing chart for describing an example of the operation of the electronic device EA according to the second embodiment. As shown in FIG. 22, one frame period Pf includes a first sub-frame period PsfR, a second sub-frame period PsfG, a third sub-frame period PsfB, and a fourth sub-frame period PsfT which are independent of each other. In this example, the first sub-frame period PsfR, the second sub-frame period PsfG, the third sub-frame period PsfB, and the fourth sub-frame period PsfT are continued in this order.

Incidentally, unlike the present embodiment, the order of these sub-frame periods Psf may be reversed. However, the first sub-frame period PsfR, the second sub-frame period PsfG, and the third sub-frame period PsfB are preferably continuous. As a result, the distortion of the image displayed in the display region DA can be suppressed.

The first sub-frame period PsfR, the second sub-frame period PsfG, and the third sub-frame period PsfB each include a write period Pw and a light emission period Ph subsequent to the write period Pw. The fourth sub-frame period PsfT includes the write period Pw and a non-light emission period Pd.

At least one sub-frame period Psf of the first sub-frame period PsfR, the second sub-frame period PsfG, the third sub-frame period PsfB, and the fourth sub-frame period PsfT further includes the reset period Pr. In the present embodiment, the first sub-frame period PsfR, the second sub-frame period PsfG, the third sub-frame period PsfB, and the fourth sub-frame period PsfT each include the reset period Pr.

In the first sub-frame period PsfR, the second sub-frame period PsfG, and the third sub-frame period PsfB, the reset period Pr is independent of the write period Pw and the light emission period Ph and is subsequent to the light emission period Ph. In the fourth sub-frame period PsfT, the reset period Pr is independent of the write period Pw and the non-light emission period Pd, and is subsequent to the non-light emission period Pd. However, unlike the present embodiment, the reset period Pr may precede the write period Pw.

As in the second embodiment, the fourth sub-frame period PsfT preferably includes the reset period Pr. As a result, the reset period Pr of the fourth sub-frame period PsfT can be set to the image capturing period Pe.

The control unit CON outputs an exposure trigger signal TG to the imaging circuit IM. A timing at which the exposure trigger signal TG is asserted (here, falls) matches, for example, a timing at which the vertical synchronization signal Vsync falls. However, the timing at which the exposure trigger signal TG is asserted can be variously modified.

The imaging circuit IM to which the exposure trigger signal TG is input generates an exposure timing signal TM to be asserted (here, rises) within the fourth sub-frame period PsfT. The imaging circuit IM can generate the exposure timing signal TM by calculating a time period from a timing at which the exposure trigger signal TG is asserted to a timing at which the exposure timing signal TM is asserted, or by calculating a time period at which the exposure timing signal TM is asserted.

The driving of the display panel PNL and the light source unit LU in the first sub-frame period PsfR, the second sub-frame period PsfG, and the third sub-frame period PsfB is similar to the driving in the first embodiment.

In the write period Pw of the fourth sub-frame period PsfT, the gate driver GD sequentially applies the high-level gate signal VG to each of the gate lines G1 to Gn. Furthermore, while the gate signal is applied, the source driver SD applies the source line voltage Vsig (min) having the minimum value (min) of the gradation to each of the source lines S1 to Sm. More specifically, the operation of simultaneously supplying the source line voltage Vsig (min) to each pixel PX of the line to which the gate signal is supplied through each of the source lines S1 to Sm is repeated. The electric potential of the pixel electrode 11 is held by applying the source line voltage Vsig (min) to the pixel electrode 11 of the pixel PX corresponding to the selected gate line G through the switching element SW and then switching the switching element SW to the non-conductive state. Thereafter, the gate line G of a next row is selected, and similar driving is sequentially performed. Incidentally, in this example, the polarity of the common voltage Vcom for driving the common electrode 21 is inverted for each sub-frame period Psf. More specifically, the polarity of the common voltage Vcom is inverted after a timing at which the writing of the second transparent voltage VA2 to all the pixels PX is ended in the reset period Pr.

By such an operation, the control unit CON can apply the transparent voltage (first transparent voltage VA1) to the plurality of liquid crystal regions 3 in the write period Pw of the fourth sub-frame period PsfT.

The non-light emission period Pd of the fourth sub-frame period PsfT is a period from the completion of writing to all the pixels PX to the arrival of the reset period Pr. In the non-light emission period Pd, the control unit CON holds the state where the transparent voltage (first transparent voltage VA1) is applied to the plurality of liquid crystal regions 3, prohibits the irradiation of the light of the first color by the light emitting element LSR, prohibits the irradiation of the light of the second color by the light emitting element LSG, and prohibits the irradiation of the light of the third color by the light emitting element LSB.

As a result, the control unit CON can transmit the external light beam in all the liquid crystal regions 3.

In the reset period Pr of the fourth sub-frame period PsfT, the transparent driving is executed under the control of the timing controller TC. The driving of the display panel PNL and the light source unit LU in the reset period Pr of the fourth sub-frame period PsfT is similar to the driving of the display panel PNL and the light source unit LU in the reset period Pr of each of the first sub-frame period PsfR, the second sub-frame period PsfG, and the third sub-frame period PsfB.

The control unit CON sets the capturing period Pe within the fourth sub-frame period PsfT together with the imaging circuit IM. In the present embodiment, the control unit CON sets the capturing period Pe to the write period Pw, the non-light emission period Pd, and the reset period Pr of the fourth sub-frame period PsfT.

In the fourth sub-frame period PsfT, since the scattering voltage VB is not applied to each liquid crystal region 3, the subject can be captured by the camera CA in a state where the transparency of the display region DA is increased.

In addition, since the subject can be captured by the camera CA not only in the write period Pw and the reset period Pr but also in the non-light emission period Pd, a situation in which the amount of exposed light degrades can be avoided.

Furthermore, the camera CA may perform capturing once every one frame period Pf. Since one frame period of the display device DSP is 1/60 seconds, a camera operating at 60 Hz can be used as the camera CA. Incidentally, in a case where one frame period of the display device DSP is 1/50 seconds, a camera operating at 50 Hz can be used as the camera CA. As the camera CA, a high-performance camera that operates at a high frequency such as 180 Hz may not be used. For this reason, the electronic device EA can include the camera CA having a simple configuration and being inexpensive, and can suppress an increase in product price of the electronic device EA.

The first sub-frame period PsfR, the second sub-frame period PsfG, the third sub-frame period PsfB, and the fourth sub-frame period PsfT can have, for example, the same length. The color chromaticity of the display image may be adjusted or the amount of exposed light may be adjusted by varying a ratio of the first sub-frame period PsfR, the second sub-frame period PsfG, the third sub-frame period PsfB, and the fourth sub-frame period PsfT.

In the second embodiment having the above-described configuration, effects similar to the effects of the first embodiment can also be obtained.

Third Embodiment

Next, a third embodiment will be described. An electronic device EA similarly has a configuration similar to the configuration of the electronic device EA of the first embodiment except for configurations to be described in the third embodiment. FIG. 23 is a block diagram showing the electronic device EA according to the third embodiment by using functional blocks.

As shown in FIG. 23, the electronic device EA further includes a polarizing element POL as compared with the first embodiment (FIG. 1). The polarizing element POL is located between the display region DA of the display panel PNL and the camera CA. The polarizing element POL may be configured to transmit one polarization component. In the present embodiment, the polarizing element POL is a polarizer.

FIG. 24 is an exploded perspective view showing a part of the electronic device EA according to the third embodiment, and is a diagram showing the alignment films 12 and 22, the liquid crystal layer 30, the polarizing element POL, and the camera CA. As shown in FIG. 24, the polarizing element POL has an easy transmission axis AXa and an absorption axis AXb orthogonal to each other. In the present embodiment, the easy transmission axis AXa is parallel to the second direction Y, and the absorption axis AXb is parallel to the first direction X. For this reason, the camera CA can take in the external light beam transmitted through the display region DA of the display panel PNL and the polarizing element POL in the capturing period Pe.

Rubbing is applied to the alignment film (rubbing alignment film) 12 in a first treatment direction AL1, and rubbing is applied to the alignment film (rubbing alignment film) 22 in ae second treatment direction AL2. In the present embodiment, the first treatment direction AL1 is a direction opposite to the first direction X, and the second treatment direction AL2 is a direction identical to the first direction X. Since initial alignment directions of the plurality of liquid crystalline molecules 32 can be aligned in the identical direction, the transmittance can be increased.

However, the first treatment direction AL1 and the second treatment direction AL2 may be directions identical to each other. In addition, instead of rubbing, a photo-alignment treatment may be applied to each of the alignment films 12 and 22. In this case, a direction in which the alignment treatment is performed on the alignment film (optical alignment film) 12 by an optical alignment method and a direction in which he alignment treatment is performed on the alignment film (optical alignment film) 22 by a photo-alignment method may be parallel to the first direction X. Alternatively, one of the alignment film 12 and the alignment film 22 may be an optical alignment film, and the other may be a rubbing alignment film.

Figure 25A:
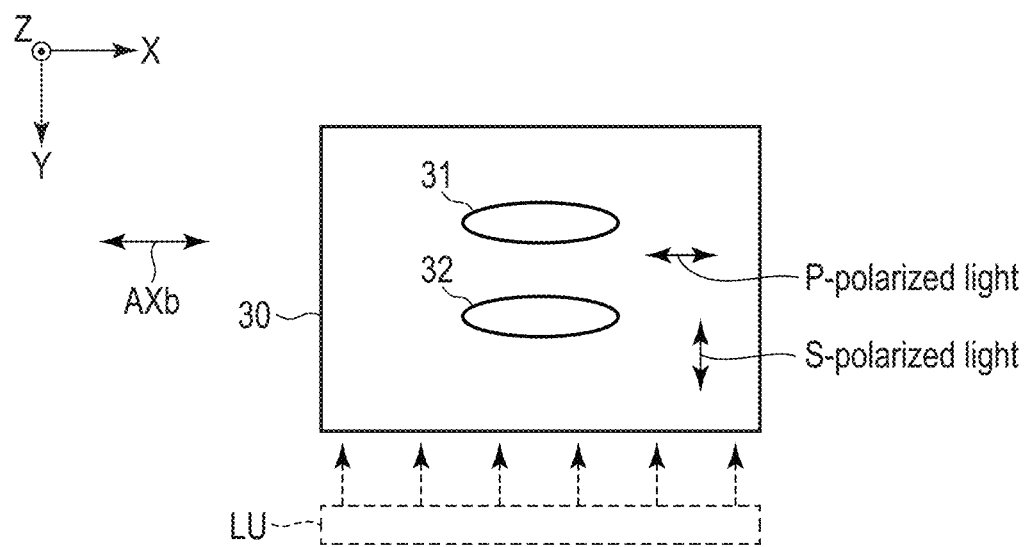
FIG. 25A is a diagram schematically showing a liquid crystal layer in a transparent state and a light source unit.
Figure 25B:
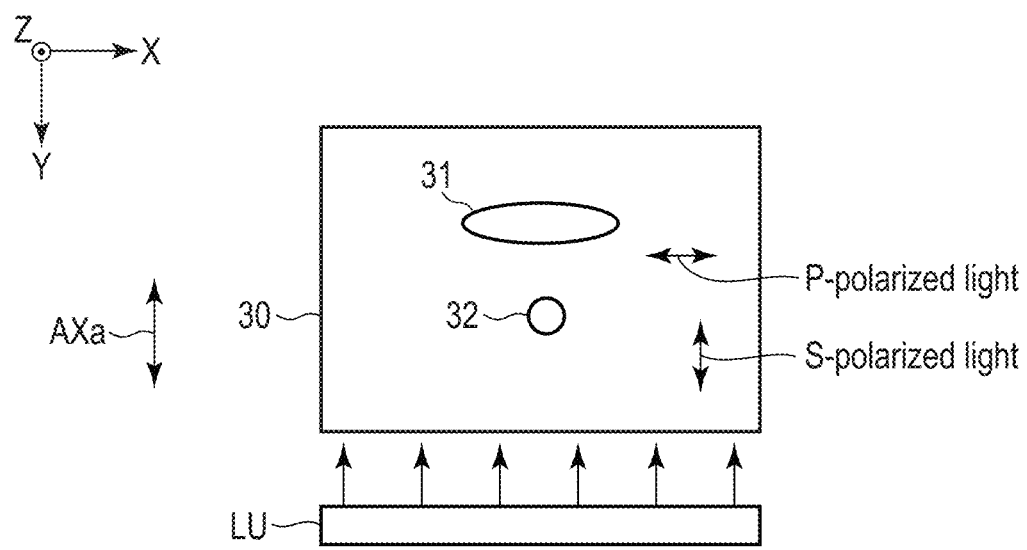
FIG. 25B is a diagram schematically showing the liquid crystal layer in a scattered state and the light source unit.

FIG. 25A is a diagram schematically showing the liquid crystal layer 30 in the transparent state and the light source unit LU. FIG. 25B is a diagram schematically showing the liquid crystal layer 30 in the scattered state and the light source unit LU.

As shown in FIG. 25A, the liquid crystal layer 30 in the transparent state is in a state where the second transparent voltage VA2 is applied to the liquid crystal layer 30. In planar view, a major axis of the liquid crystalline polymer 31 and a major axis of the liquid crystalline molecules 32 are parallel to the first direction X. For the plurality of liquid crystalline molecules 32, a director of each liquid crystal region 3 to which the transparent voltage (second transparent voltage VA2) is applied is parallel to the absorption axis AXb in planar view.

There is almost no refractive index difference between the liquid crystalline polymer 31 and the liquid crystalline molecules 32. The liquid crystal layer 30 in the transparent state can transmit the external light beam with hardly scattered. Even though the illumination light of the light source unit LU is incident on the liquid crystal layer 30 to which the second transparent voltage VA2 is applied, the liquid crystal layer 30 transmits the illumination light with hardly scattered.

As shown in FIG. 25B, the liquid crystal layer 30 in the scattered state is in a state where the scattering voltage VB is applied to the liquid crystal layer 30. There is a large refractive index difference between the liquid crystalline polymer 31 and the liquid crystalline molecules 32. The light to be incident on the liquid crystal layer 30 in the scattered state has different parallelisms (degrees of scattering) in accordance with the polarization state as will be described later.

In addition, even though the illumination light of the light source unit LU is incident on the liquid crystal layer 30 to which the scattering voltage VB is applied, the liquid crystal layer 30 scatters the illumination light. A direction in which the light source unit LU irradiates the display region DA of the display panel PNL with light is preferably perpendicular to the first treatment direction AL1 and the second treatment direction AL2 in planar view. In other words, a direction in which the light source unit LU irradiates the display region DA of the display panel PNL with light is desirably perpendicular to a director of each liquid crystal region 3 to which the transparent voltage (second transparent voltage VA2) is applied in planar view. As a result, the light irradiated from the light source unit LU can be efficiently extracted to the outside of the display panel PNL.

FIG. 26 is a graph representing changes in transmittance with respect to a voltage in S-polarized light, P-polarized light, and N-polarized light. As shown in FIG. 26, it can be seen that light in a certain polarization state (S-polarized light) can be transmitted through the display panel PNL (liquid crystal layer 30) regardless of a value of the voltage to be applied to the liquid crystal layer 30. That is, even though the scattering voltage VB is applied, the first transparent voltage VA1 is applied, or the second transparent voltage VA2 is applied to the liquid crystal layer 30, there is almost no change in the parallelism (degree of scattering) of the S-polarized light transmitted through the liquid crystal layer 30.

Thus, the electronic device EA of the third embodiment causes the camera CA to take in only a component of the S-polarized light in the external light beam by using the polarizing element POL. As a result, in the write period Pw and the reset period Pr, the camera CA can capture the subject under the identical condition. The camera CA does not take in a component of the P-polarized light in the external light beam. For this reason, degradation of image quality such as distortion hardly occur in the image captured by the camera CA.

In a case where the electronic device EA of the third embodiment is used, it is suitable for the operation of the electronic device EA of setting the capturing period Pe to the write period Pw. For example, the electronic device EA of the third embodiment preferably performs the operation shown in FIG. 18 or the operation shown in FIG. 22 described above. However, the electronic device EA of the third embodiment may perform the operation shown in FIG. 19 described above.

In the third embodiment having the above-described configuration, effects similar to the effects of the first embodiment can also be obtained.

Even though only the S-polarized light in the external light beam is taken into the camera CA, since the subject can be captured by the camera CA in both the write period Pw and the reset period Pr, it is possible to avoid a situation in which the amount of exposed light degrades.

In addition, since the S-polarized light of the external light beam can be transmitted through the liquid crystal layer 30 regardless of the value of the voltage to be applied to the liquid crystal layer 30, the camera CA can more clearly capture the subject through the display panel PNL.

Fourth Embodiment

Figure 27:
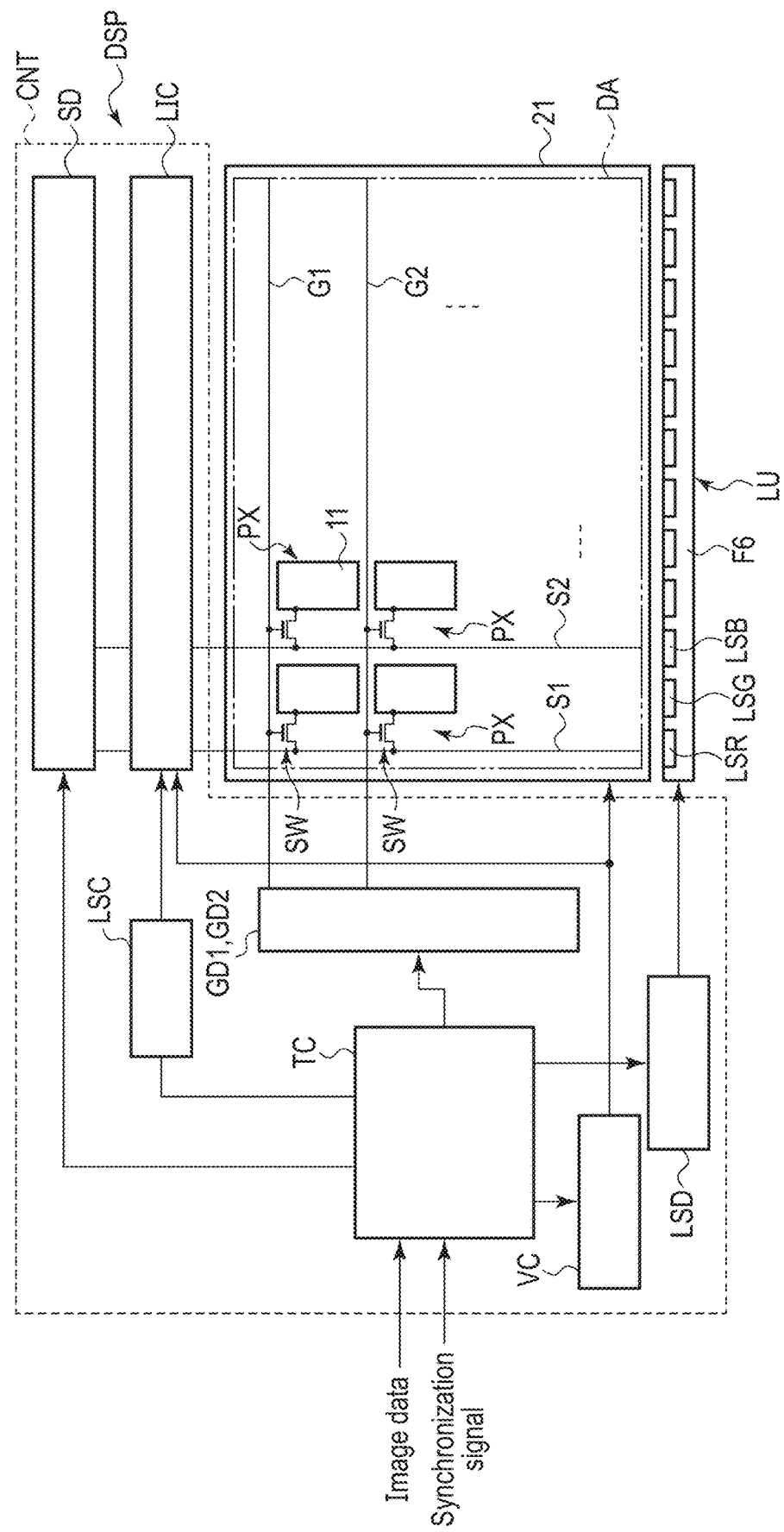
FIG. 27 is a diagram showing main components of a display device of an electronic device according to a fourth embodiment.

Next, a fourth embodiment will be described. An electronic device EA has a configuration similar to the configuration of the electronic device EA of the first embodiment except for configurations to be described in the fourth embodiment. FIG. 27 is a diagram showing main components of the display device DSP of the electronic device EA according to the fourth embodiment.

As shown in FIG. 27, the display device DSP is different from the configuration shown in FIG. 4 in that the controller CNT includes a level conversion circuit (level shift circuit) LSC and a Vcom drawing circuit LIC.

The common voltage (Vcom) to be supplied from the Vcom circuit VC is supplied to the common electrode 21 and is also supplied to the Vcom drawing circuit LIC. The Vcom drawing circuit LIC is interposed between the source driver SD and each source line S. The Vcom drawing circuit LIC supplies the video signal output from the source driver SD to each source line S. In addition, the Vcom drawing circuit LIC can supply the common voltage from the Vcom circuit VC to each source line S.

Figure 28:
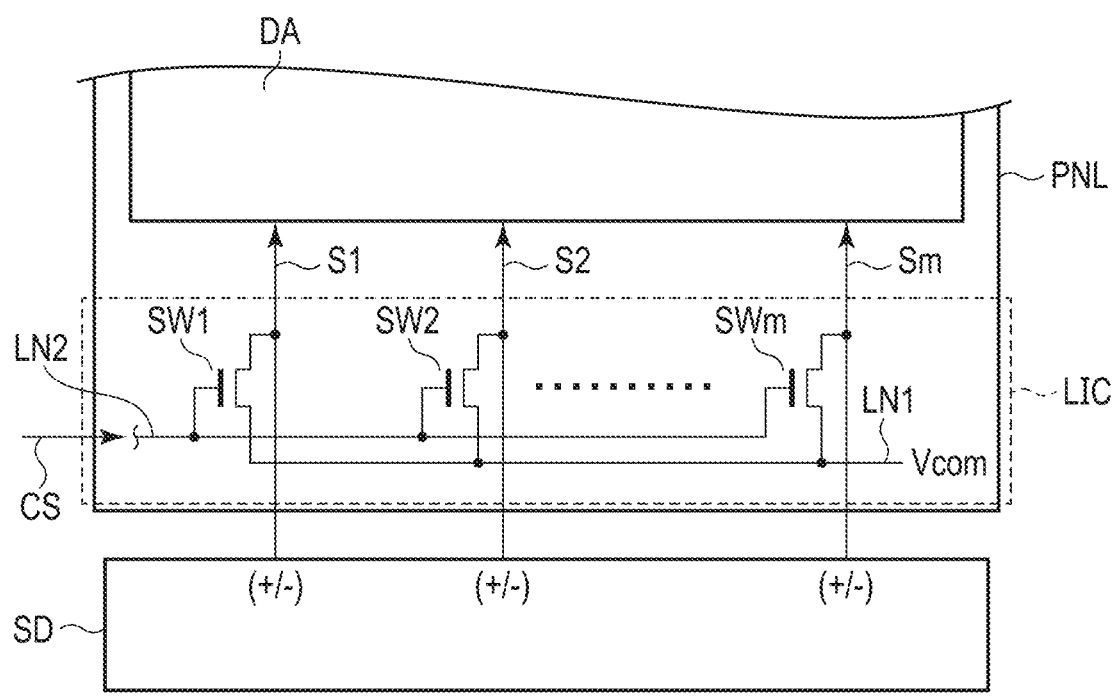
FIG. 28 is a diagram showing a configuration example of a Vcom drawing circuit shown in FIG. 27.

FIG. 28 is a diagram showing a configuration example of the Vcom drawing circuit LIC shown in FIG. 27. As shown in FIG. 28, the Vcom drawing circuit LIC includes switching elements SW1 to SWm. For example, the switching elements SW1 to SWm are disposed on the first substrate SUB1 of the display panel PNL. A wiring line LN1 is connected to an input terminal (source) of each of the switching elements SW1 to SWm, each of the source lines S1 to Sm is connected to an output terminal (drain) of each of the switching elements SW1 to SWm, and a wiring line LN2 is connected to a control terminal (gate) of each of the switching elements SW1 to SWm.

The Vcom circuit VC shown in FIG. 27 supplies the common voltage Vcom to the wiring line LN1. Incidentally, this operation can be applied to, for example, the driving in the reset period Pr. In addition, the timing controller TC outputs the control signal CS to the level conversion circuit LSC when the transparent driving is executed. The level conversion circuit LSC converts the control signal CS into a voltage of a predetermined level and supplies the voltage to the wiring line LN2. When the control signal CS is supplied to the wiring line LN2, the wiring line LN1 and each of the source lines S1 to Sm are conducted, and the common voltage Vcom of the wiring line LN1 is supplied to each of the source lines S1 to Sm.

In a state where the common voltage Vcom is supplied to each of the source lines S1 to Sm in this manner, when the gate signal is supplied to each of gate lines G1 to Gn, the common voltage Vcom of each of the source lines S1 to Sm is supplied to each pixel electrode 11. That is, the electric potential difference between each pixel electrode 11 and the common electrode 21 becomes 0 V (second transparent voltage VA2).

In the fourth embodiment having the above-described configuration, effects similar to the effects of the first embodiment can also be obtained. In the configuration of the fourth embodiment, there is no need to provide a circuit or the like for supplying a voltage (for example, common voltage Vcom) for transparent driving to the source driver SD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. It is also possible to combine a plurality of embodiments and modified examples as needed.

For example, the display device DSP may have a configuration without the light source unit LU. In this case, the display device DSP may include a polarizer and a liquid crystal display panel using a liquid crystal other than the polymer dispersed liquid crystal instead of the display panel PNL using the polymer dispersed liquid crystal. Alternatively, the display device DSP may include a transparent organic EL display panel instead of the display panel PNL using the polymer dispersed liquid crystal. However, in consideration of the transparency and the aperture ratio of the display panel as described above, it is more suitable to use a transparent liquid crystal display panel having higher transparency than a transparent organic EL display panel.

Each sub-frame data stored in the line memories 52R, 52G, and 52B is an example of first sub-frame data representing an image of a first color, second sub-frame data representing an image of a second color, and third sub-frame data representing an image of a third color.

The first color, the second color, and the third color are not limited to red, green, and blue, respectively. In addition, the light source unit LU may include the light emitting elements LS of two or less colors, or may include the light emitting elements LS of four or more colors. Alternatively, the light source unit LU may include a white light emitting element LS. The number of line memories, the number of pieces of sub-frame data, and the number of sub-frame periods may be increased or decreased in accordance with the number of types (the number of colors) of the light emitting elements LS.

A normal mode polymer dispersed liquid crystal may be used as the liquid crystal layer 30. The liquid crystal layer 30 maintains the parallelism of the light to be incident in a case where the voltage to be applied is high, and scatters the light to be incident in a case where the voltage to be applied is low.

What is claimed is:
1. An electronic device comprising:
a display panel configured to display an image and including a display region that transmits external light;
a light source unit located outside a region opposed to the display region of the display panel;
a camera opposed to the display region of the display panel; and
a control unit configured to control driving of the display panel, the light source unit, and the camera,
wherein
the control unit is configured to
in a light emission period, permit irradiation of light by the light source unit, irradiate the display region with light, display the image in the display region, and prohibit capturing by the camera, and in a capturing period independent of the light emission period, prohibit the irradiation of the light by the light source unit, set the display region to be transparent, permit the capturing by the camera, and take in the external light transmitted through the display region to the camera, the display panel includes a plurality of pixel electrodes, a common electrode, and a display function layer respectively located in the display region, the control unit is configured to
  in a write period, apply a voltage between each of the pixel electrodes and the common electrode, and prohibit the irradiation of the light by the light source unit, and
  in the light emission period independent of the write period and subsequent to the write period, irradiate the display function layer with light, the display function layer includes a plurality of display function regions, a scattering voltage and a transparent voltage are selectively applied to each of the display function regions by applying a voltage between one corresponding pixel electrode of the pixel electrodes and the common electrode, the control unit is configured to
  in the write period, selectively apply the scattering voltage and the transparent voltage to the display function regions,
  in the light emission period, hold a state where the scattering voltage and the transparent voltage are selectively applied to the display function regions, and scatter the light irradiated by the light source unit in a plurality of display function regions to which the scattering voltage is applied among the display function regions, and
  in the capturing period, apply the transparent voltage to the display function regions, and transmit the external light in the display function regions, parallelism of the external light transmitted through each of the display function regions when the transparent voltage is applied is higher than parallelism of the external light transmitted through each of the display function regions when the scattering voltage is applied, the light source unit includes a first light emitting element configured to irradiate the display function layer with light of a first color, second light emitting element configured to irradiate the display function layer with light of a second color, and third light emitting element configured to irradiate the display function layer with light of a third color, one frame period includes a first sub-frame period, a second sub-frame period, a third sub-frame period, and a fourth sub-frame period independent of each other, the first sub-frame period, the second sub-frame period, and the third sub-frame period each include the write period and the light emission period, the fourth sub-frame period includes the write period and a non-light emission period, at least one sub-frame period of the first sub-frame period, the second sub-frame period, the third sub-frame period, and the fourth sub-frame period further includes a reset period, in a case where the first sub-frame period, the second sub-frame period, and the third sub-frame period include the reset period, the reset period is a period independent of the write period and the light emission period and proceeding the write period or subsequent to the light emission period, in a case where the fourth sub-frame period includes the reset period, the reset period is a period independent of the write period and the non-light emission period and proceeding the write period or subsequent to the non-light emission period, the control unit is configured to
  selectively apply the scattering voltage and the transparent voltage to the display function regions in the write period of each of the first sub-frame period, the second sub-frame period, and the third sub-frame period,
  in the light emission period of the first sub-frame period, permit the irradiation of the light of the first color by the first light emitting element, prohibit the irradiation of the light of the second color by the second light emitting element, prohibit the irradiation of the light of the third color by the third light emitting element, and scatter the light of the first color in a plurality of display function regions to which the scattering voltage is applied in the write period of the first sub-frame period,
  in the light emission period of the second sub-frame period, permit the irradiation of the light of the second color by the second light emitting element, prohibit the irradiation of the light of the first color by the first light emitting element, prohibit the irradiation of the light of the third color by the third light emitting element, and scatter the light of the second color in a plurality of display function regions to which the scattering voltage is applied in the write period of the second sub-frame period,
  in the light emission period of the third sub-frame period, permit the irradiation of the light of the third color by the third light emitting element, prohibit the irradiation of the light of the first color by the first light emitting element, prohibit the irradiation of the light of the second color by the second light emitting element, and scatter the light of the third color in a plurality of display function regions to which the scattering voltage is applied in the write period of the third sub-frame period,
  in the write period of the fourth sub-frame period, apply the transparent voltage to the display function regions,
  in the non-light emission period of the fourth sub-frame period, hold a state where the transparent voltage is applied to the display function regions, prohibit the irradiation of the light of the first color by the first light emitting element, prohibit the irradiation of the light of the second color by the second light emitting element, and prohibit the irradiation of the light of the third color by the third light emitting element,
  in the reset period, apply the transparent voltage to the display function regions, and
  set the capturing period within the fourth sub-frame period.

2. The electronic device according to claim 1, wherein
in the one frame period,
the first sub-frame period, the second sub-frame period, and the third sub-frame period are continuous, and
the fourth sub-frame period includes the reset period.

3. The electronic device according to claim 2, wherein
the transparent voltage includes a first transparent voltage and a second transparent voltage, the control unit is configured to in the write period of each of the first sub-frame period, the second sub-frame period, and the third sub-frame period, selectively apply the scattering voltage and the first transparent voltage to the display function regions, in the write period of the fourth sub-frame period, apply the first transparent voltage to the display function regions, and in the reset period, apply the second transparent voltage to the display function regions, and parallelism of the external light transmitted through each of the display function regions when the second transparent voltage is applied is identical to parallelism of the external light transmitted through each of the display function regions when the first transparent voltage is applied or is higher than parallelism of the external light transmitted through each of the display function regions when the first transparent voltage is applied.

4. The electronic device according to claim 1, wherein the transparent voltage includes a first transparent voltage and a second transparent voltage, the control unit is configured to in the write period of each of the first sub-frame period, the second sub-frame period, and the third sub-frame period, selectively apply the scattering voltage and the first transparent voltage to the display function regions, in the write period of the fourth sub-frame period, apply the first transparent period to the display function regions, and in the reset period, apply the second transparent voltage to the display function regions, and parallelism of the external light transmitted through each of the display function regions when the second transparent voltage is applied is identical to parallelism of the external light transmitted through each of the display function regions when the first transparent voltage is applied or is higher than parallelism of the external light transmitted through each of the display function regions when the first transparent voltage is applied.

5. The electronic device according to claim 1, further comprising:

a polarizing element located between the display region of the display panel and the camera and having an absorption axis and an easy transmission axis orthogonal to each other, wherein the camera takes in the external light transmitted through the display region and the polarizing element in the capturing period.

6. The electronic device according to claim 5, wherein the display panel further includes a first substrate including the pixel electrodes and a first alignment film in contact with the display function layer, and a second substrate including the common electrode and a second alignment film in contact with the display function layer, the first alignment film and the second alignment film are horizontal alignment films, the display function layer is a liquid crystal layer using a reverse mode polymer dispersed liquid crystal, and is held between the first substrate and the second substrate, and a director of each of the display function regions to which the transparent voltage is applied is parallel to the absorption axis in planar view.

7. The electronic device according to claim 6, wherein a direction in which the light source unit irradiates the display region with light is perpendicular to the director of each of the display function regions to which the transparent voltage is applied in planar view.

* * * * *